(12) United States Patent
Killer et al.

(10) Patent No.: US 7,112,017 B2
(45) Date of Patent: Sep. 26, 2006

(54) METHOD AND APPARATUS FOR MACHINING A BLANK FROM ALL DIRECTIONS

(75) Inventors: Franz Killer, Gansingen (CH); Josef Scherer, Frankfurt (DE)

(73) Assignee: ALSTOM Technology Ltd, Baden (CH)

( * ) Notice: Subject to any disclaimer, the term of this patent is extended or adjusted under 35 U.S.C. 154(b) by 0 days.

(21) Appl. No.: 10/902,075

(22) Filed: Jul. 30, 2004
(Under 37 CFR 1.47)

(65) Prior Publication Data
US 2005/0191140 A1 Sep. 1, 2005

Related U.S. Application Data

(63) Continuation of application No. PCT/CH03/00052, filed on Jan. 23, 2003.

(30) Foreign Application Priority Data
Jan. 31, 2002 (CH) ..................... 0168/02

(51) Int. Cl.
*B23C 3/16* (2006.01)
(52) U.S. Cl. ............... 409/132; 29/889.7; 409/133; 409/197; 409/225
(58) Field of Classification Search ........... 409/131, 409/132, 158, 163, 133, 172, 174, 189, 197, 409/219, 225, 242, 198, 199, 165, 159; 82/129; 29/889.7
See application file for complete search history.

(56) References Cited

U.S. PATENT DOCUMENTS

| | | | | |
|---|---|---|---|---|
| 3,262,368 A | * | 7/1966 | Attermeyer et al. | 409/167 |
| 3,821,835 A | * | 7/1974 | St. Andre et al. | 29/36 |
| 3,884,122 A | * | 5/1975 | Chernov et al. | 409/167 |
| 4,031,809 A | * | 6/1977 | Shraiman et al. | 409/84 |
| 4,597,155 A | * | 7/1986 | Garnett et al. | 29/564 |
| 4,730,382 A | * | 3/1988 | Parsons | 29/563 |
| 4,782,567 A | * | 11/1988 | Kanaya et al. | 29/33 P |
| 4,856,178 A | * | 8/1989 | Salvagnini | 483/20 |
| 5,062,195 A | | 11/1991 | Binder | 29/568 |
| 5,704,262 A | * | 1/1998 | Baumbusch et al. | 82/124 |
| 2002/0014006 A1 | | 2/2002 | Brock | |

(Continued)

FOREIGN PATENT DOCUMENTS

CH          686 878 A5     7/1996

(Continued)

OTHER PUBLICATIONS

Co-pending U.S. Appl. No. 10/902,117, filed Jul. 30, 2004.

*Primary Examiner*—Daniel W. Howell
(74) *Attorney, Agent, or Firm*—Steptoe & Johnson LLP

(57) ABSTRACT

In a method of machining a blank from all directions using at least one machine tool, such as a milling machine, production of the ready-to-use, measured component which is controlled and classified with regard to quality, such as a turbine blade, occurs in as few steps and setups as possible with the use of machine tools and milling machines that as far as possible are of identical design. The blank, in a first machining step, is held by at least one first adapter and a first region is given its final partial shape corresponding to the intended use by a machine tool or milling machine. In a second machining step, the partly machined blank is held by at least one second adapter in the first, finally machined region, and the remaining region is given its final overall shape corresponding to the intended use by a machine tool or milling machine.

36 Claims, 16 Drawing Sheets

U.S. PATENT DOCUMENTS

| | | | |
|---|---|---|---|
| 2004/0123447 A1 * | 7/2004 | Ahti et al. | 29/563 |
| 2004/0129120 A1 | 7/2004 | Grossmann | |

FOREIGN PATENT DOCUMENTS

| | | | |
|---|---|---|---|
| DE | 2846851 | * | 4/1979 |
| DE | 38 24 602 A1 | | 1/1990 |
| DE | 44 01 212 C1 | | 3/1995 |
| DE | 44 30 113 A1 | | 2/1996 |
| DE | 199 48 139 A1 | | 4/2001 |
| DE | 100 35 224 A1 | | 1/2002 |
| DE | 101 16 994 A1 | | 10/2002 |
| EP | 0 411 446 A1 | | 2/1991 |
| EP | 0 659 520 A1 | | 6/1995 |
| EP | 0 827 807 A1 | | 3/1998 |
| JP | 57-15609 | * | 1/1982 |
| JP | 57-205014 | * | 12/1982 |
| JP | 63-200937 | | 8/1988 |
| JP | 6-297222 | * | 10/1994 |
| JP | 7-299628 | * | 11/1995 |
| JP | 2000-233310 | * | 9/2000 |
| JP | 2003-165012 | * | 6/2003 |
| WO | WO 03/064089 A1 | | 8/2003 |

* cited by examiner

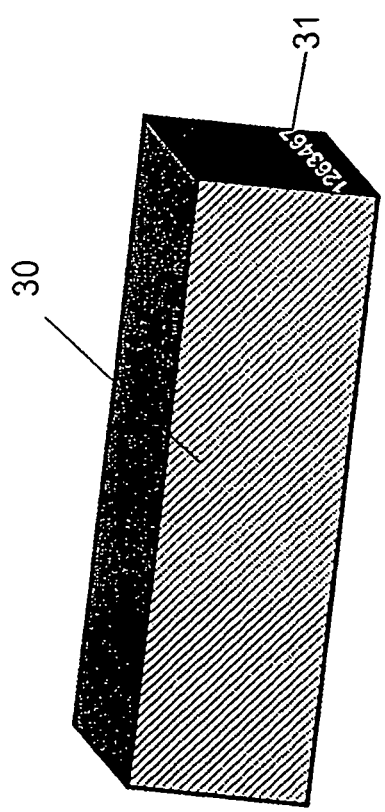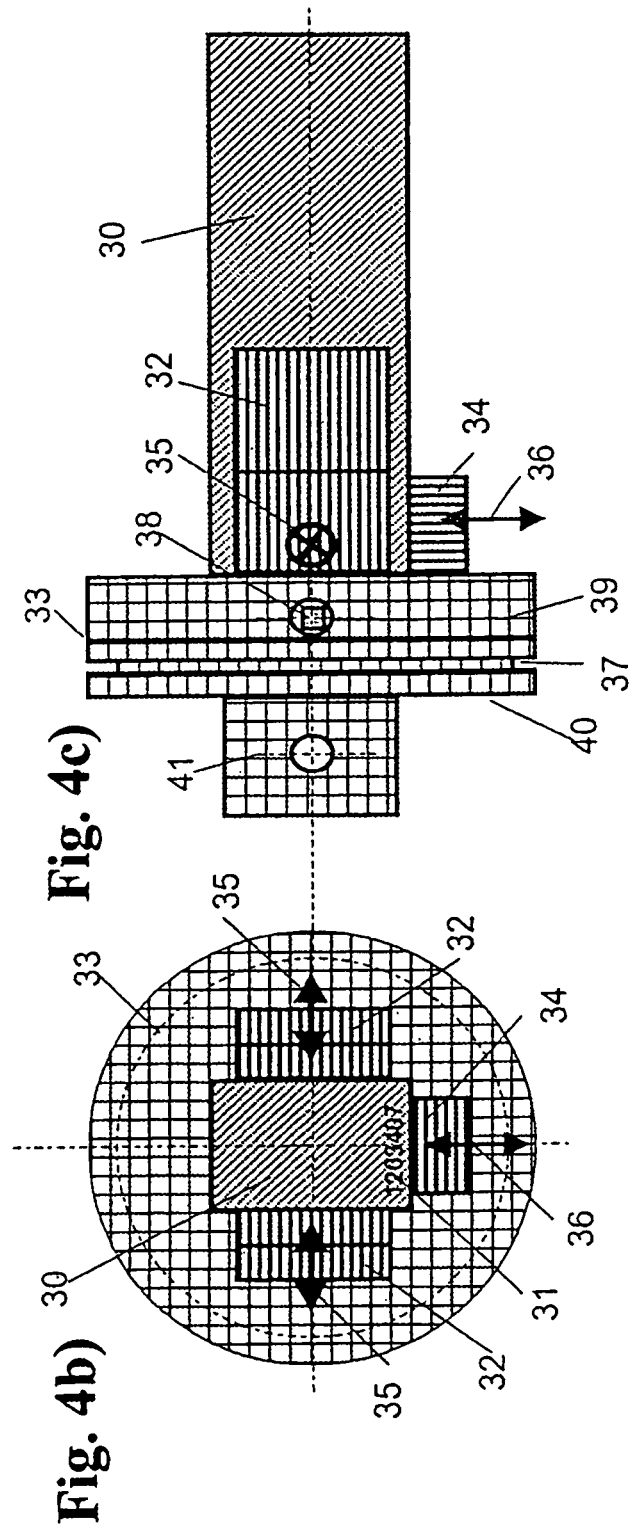

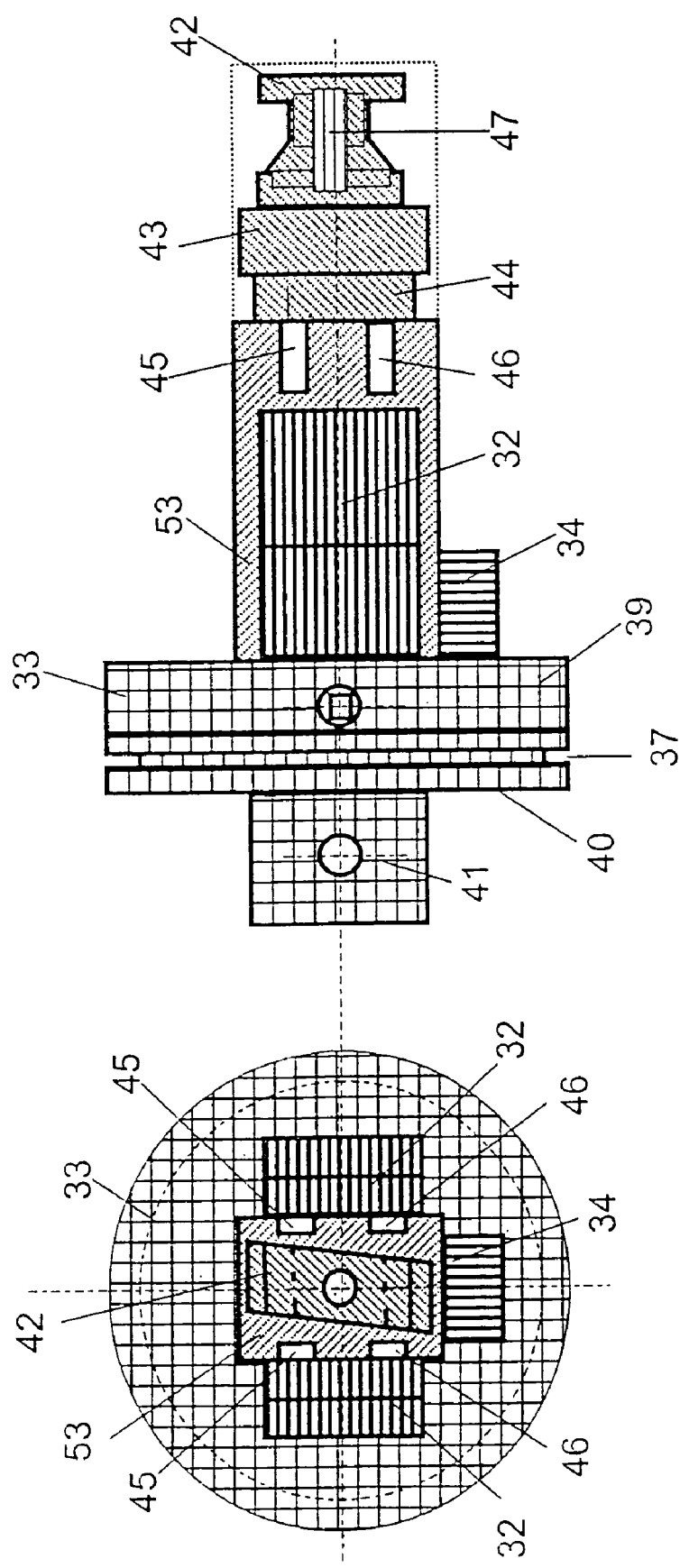

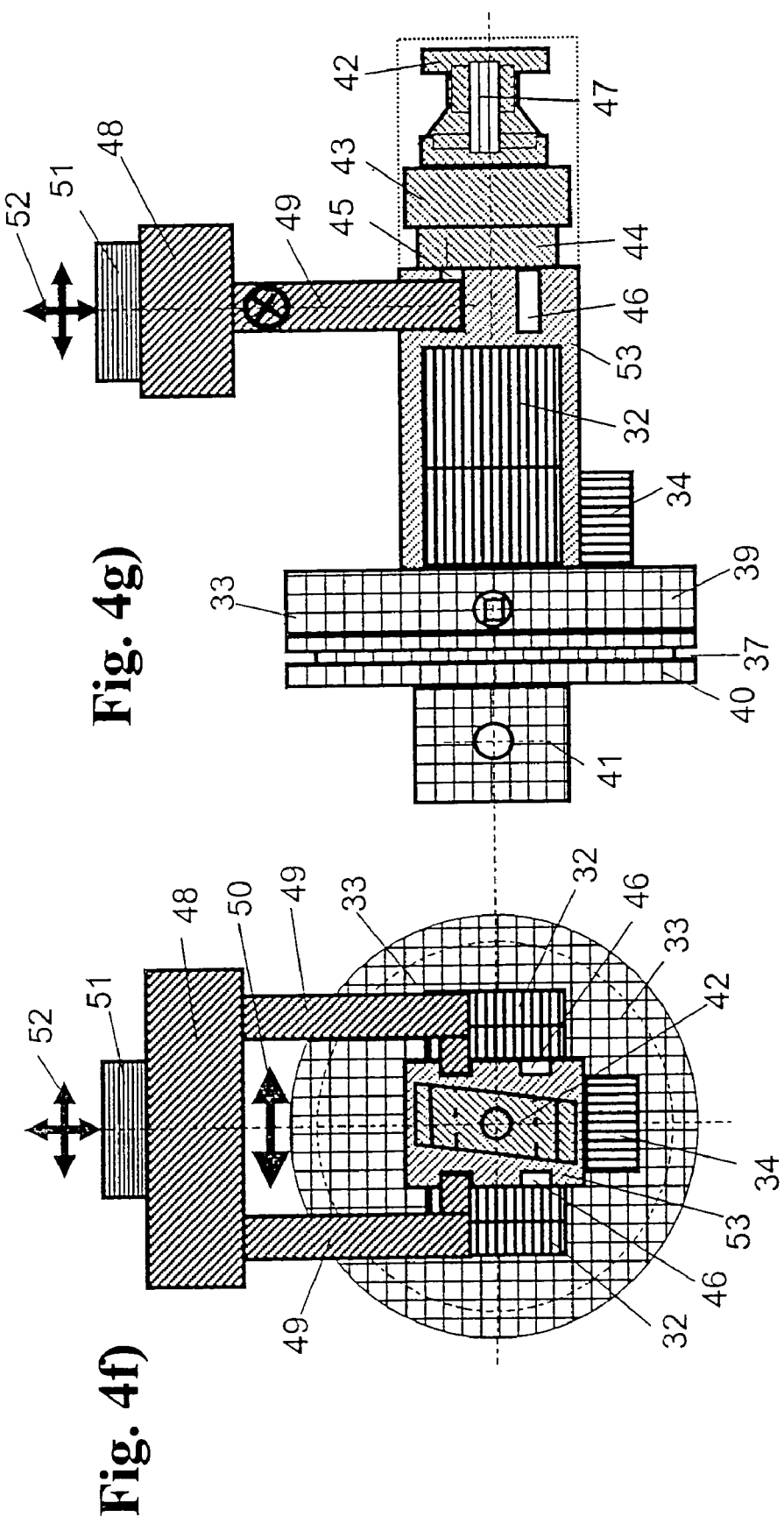

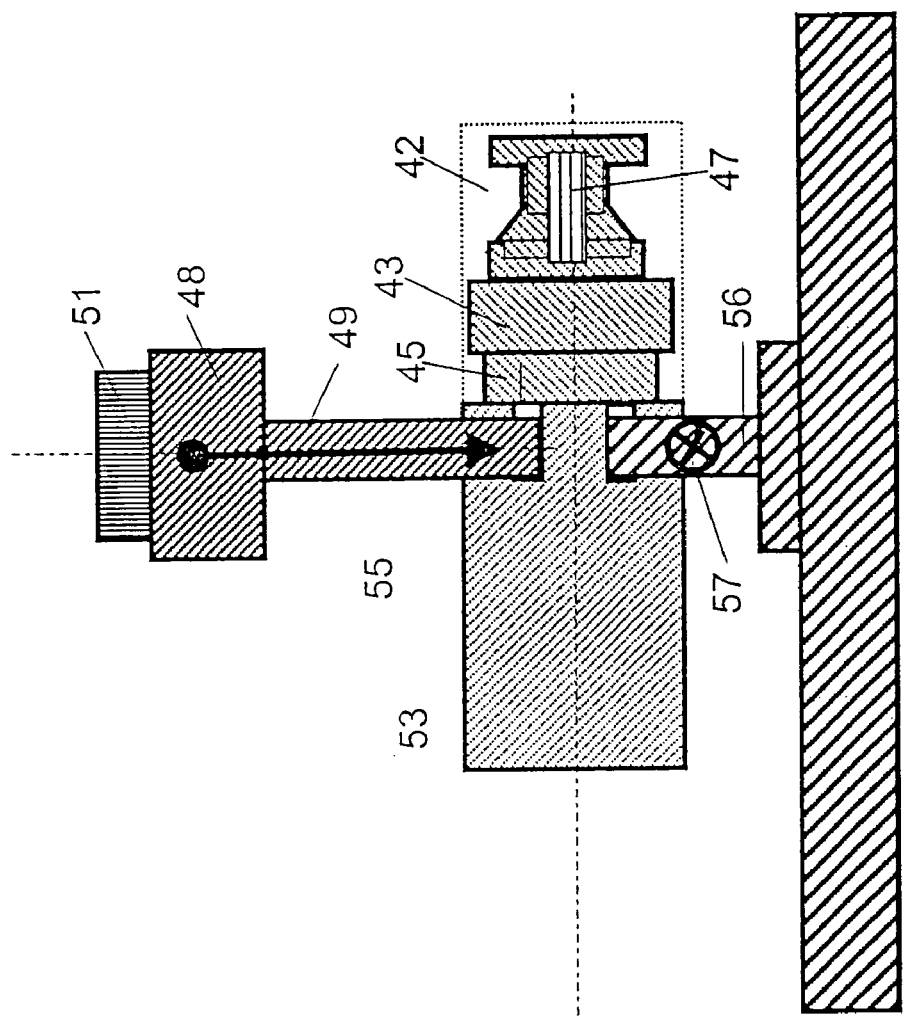
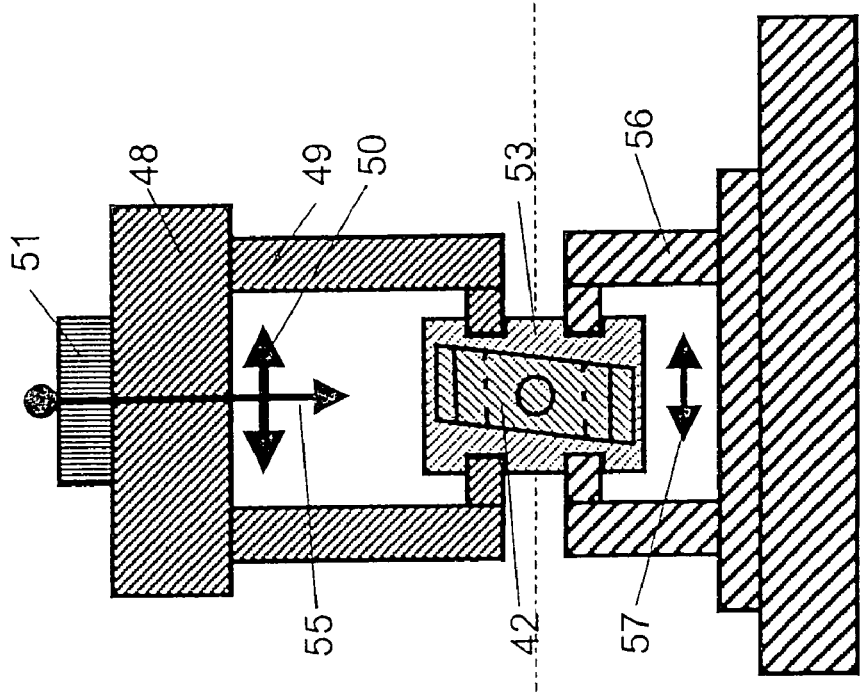
Fig. 4k)
Fig. 4i)

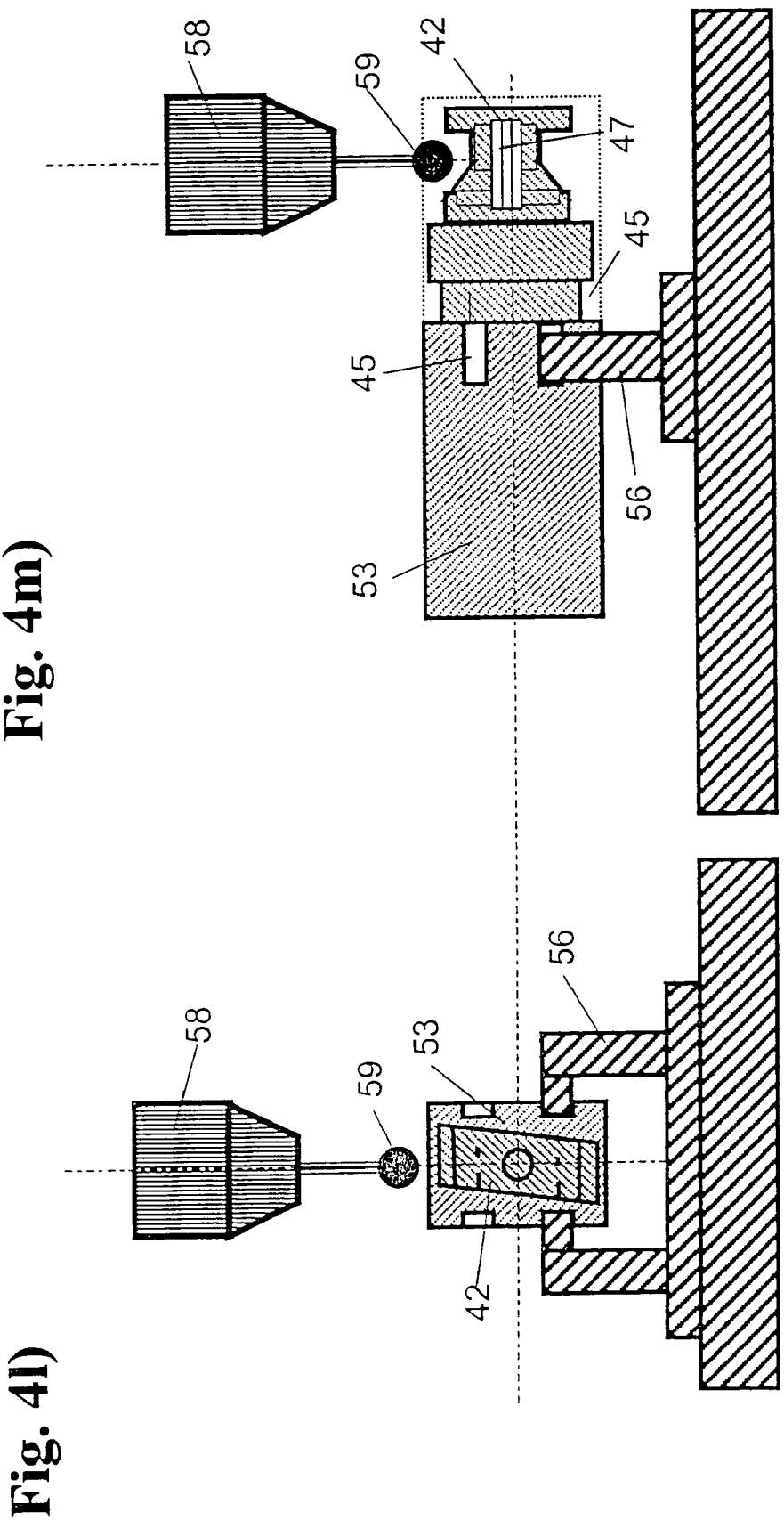

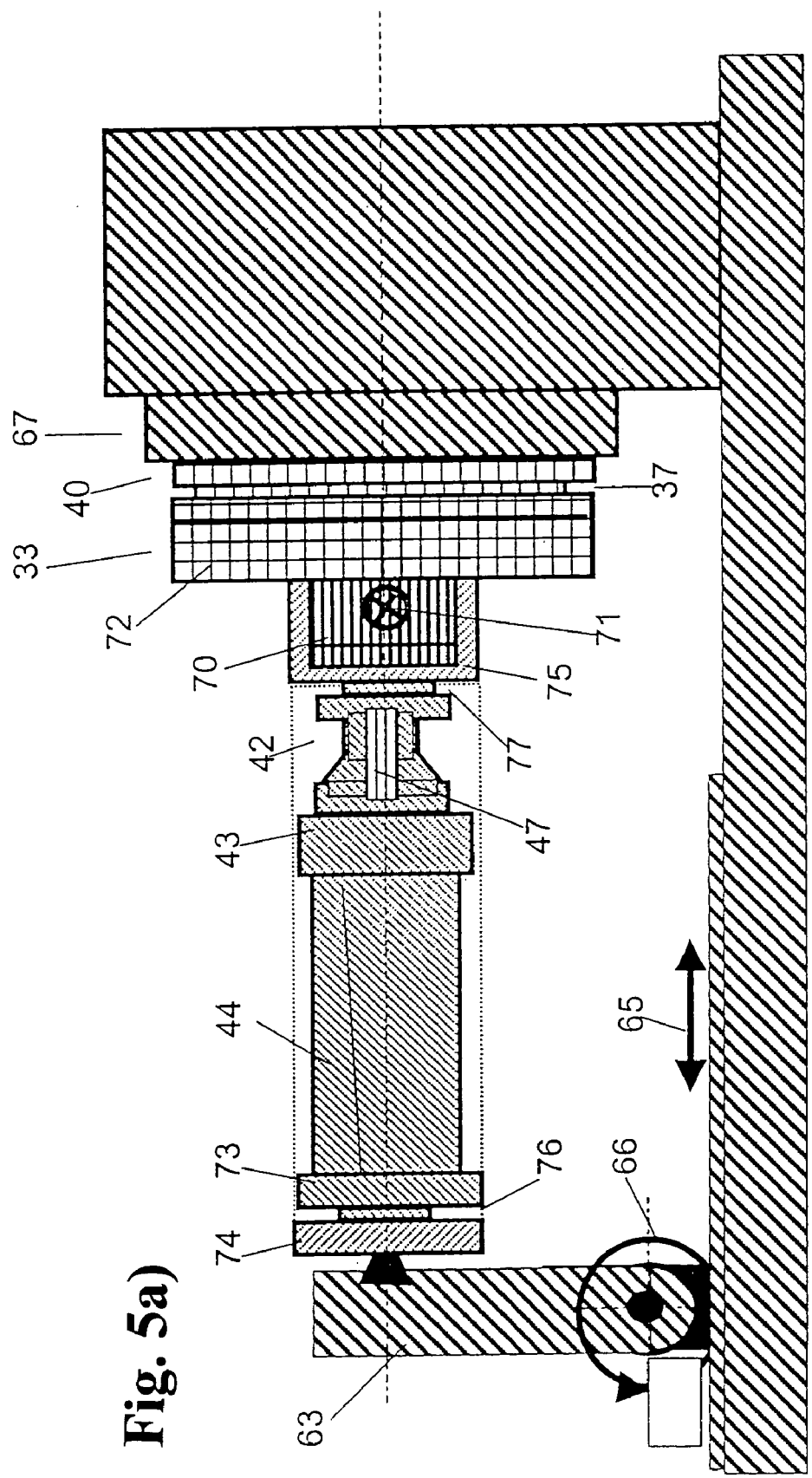

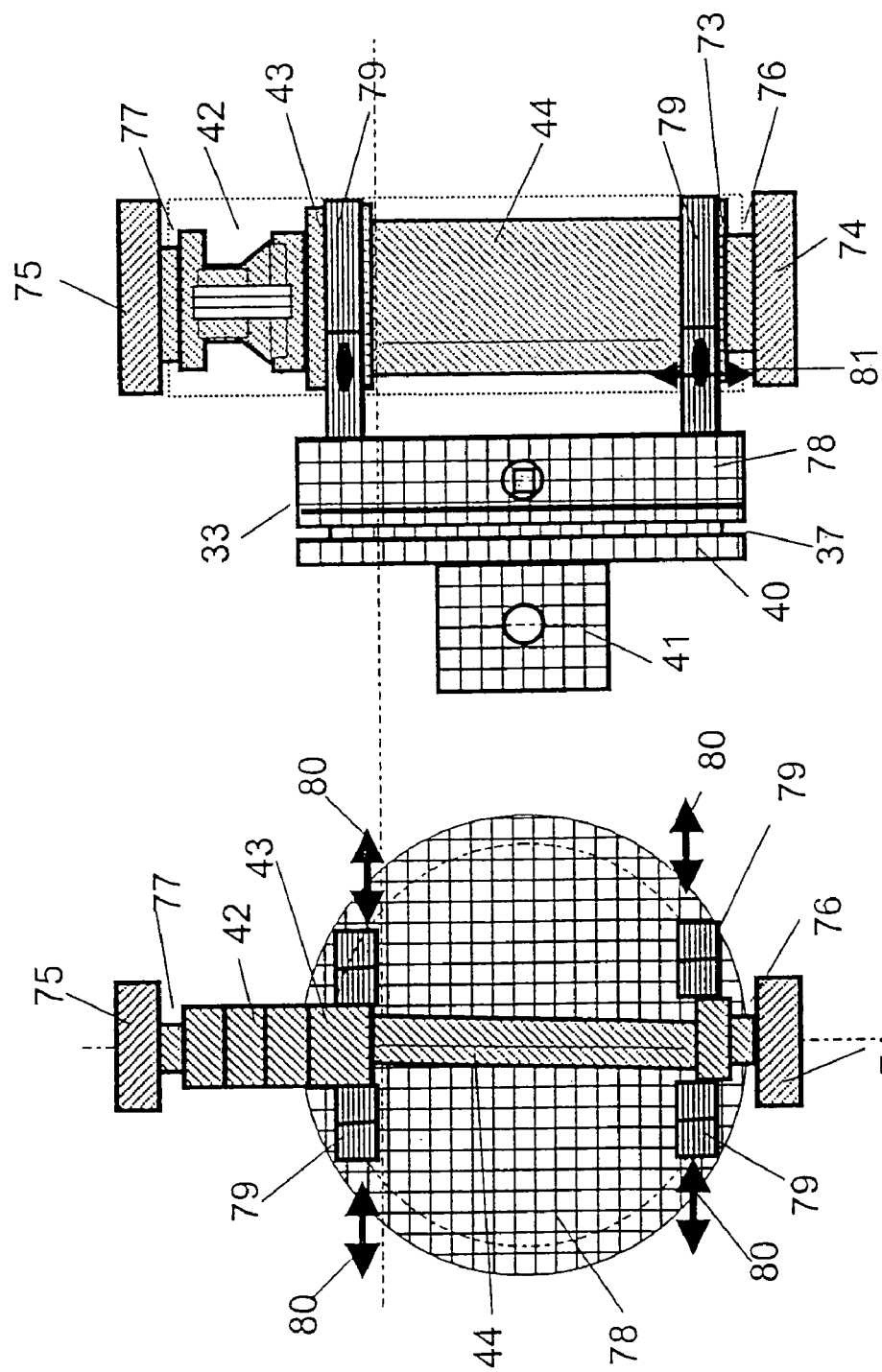

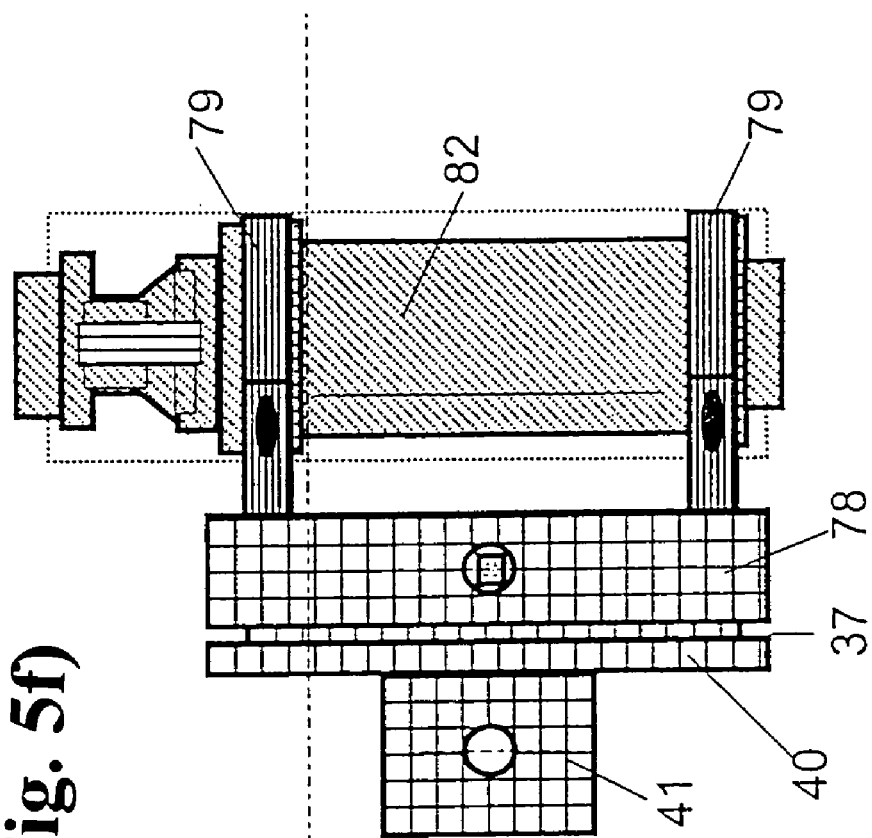
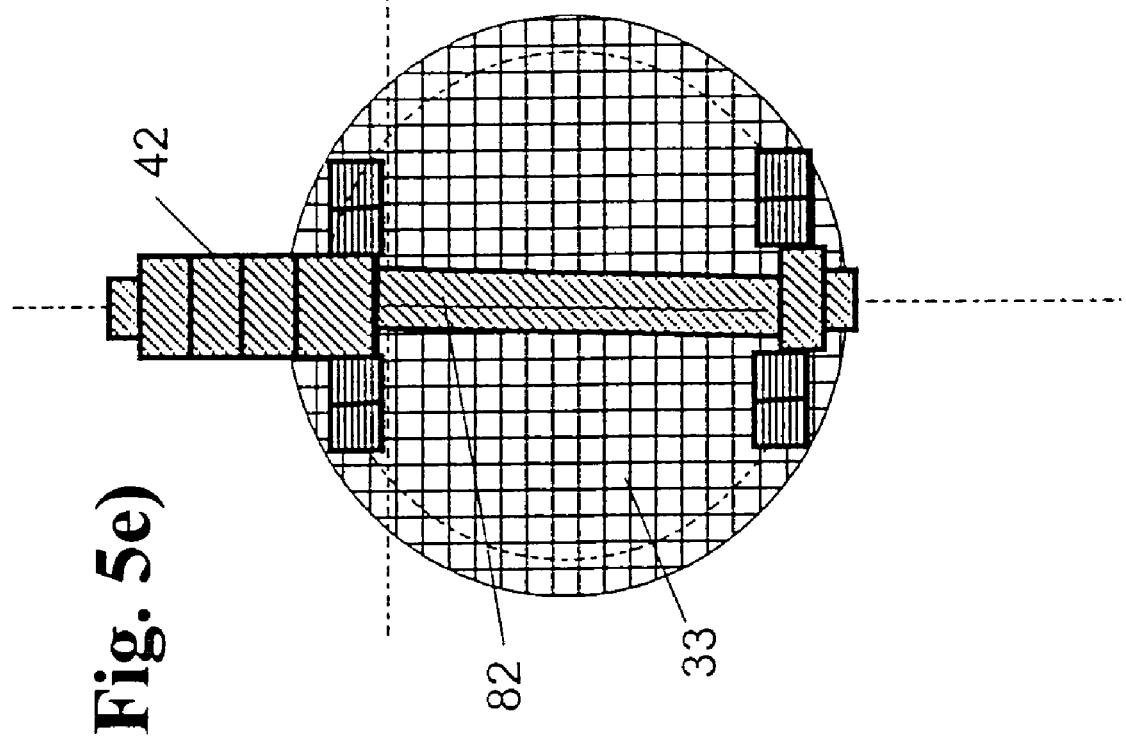
Fig. 5f)
Fig. 5e)

METHOD AND APPARATUS FOR MACHINING A BLANK FROM ALL DIRECTIONS

CROSS-REFERENCE TO RELATED APPLICATIONS

This application is a continuation of the U.S. National Stage designation of co-pending International Patent Application PCT/CH03/00052 filed Jan. 23, 2003, the entire content of which is expressly incorporated herein by reference thereto.

FIELD OF THE INVENTION

The present invention relates to a method of machining blanks or pre-machined workpieces from all directions using at least one machine tool, such as a milling machine for example, in order to produce ready-to-deliver components which are finally machined in their three-dimensional shape.

BACKGROUND OF THE INVENTION

During the production of turbine blades, work is normally carried out with multi-spindle machining. This means that a blank is first of all subjected to rough pre-machining, then the airfoil region is processed in detail, and then the tip and finally the root are produced. Between these individual machining steps, the workpiece must be reset in each case by hand or by a robot; this is because the milling machines are often only able to carry out individual machining steps, and in particular because each mounting of the workpiece always only allows the machining of a certain region. This type of production is normally referred to as "box production", since in each case one machine is normally responsible for a certain machining step, and because the workpiece can be temporarily stored in a box after each machining step.

A problem with such production is, inter alia, the fact that the speed of such a production line is always determined by the speed of the slowest machining step. In addition, the multiplicity of processes for the transfer of workpieces between the individual units, such as milling machines, measuring station, washing stations, etc., requires complicated devices and leads to considerable time losses in the production process.

SUMMARY OF THE INVENTION

The present invention therefore relates to providing a method and an apparatus for machining a blank from all directions using at least one machine tool, e.g. a milling machine, which method makes possible the production of the ready-to-use component in as few machining steps and setups as possible, and with the use of machine tools, such as, for example, "milling machines (machining cells), which as far as possible are of identical design. In this case, the machine tool is able to carry out different operations such as milling, drilling, turning and/or electrical discharge machining, etc. In this context, the expression "milling machine" is therefore to be given a wide interpretation, i.e. it relates to machine tools which are not only able to carry out milling operations but if need be can also carry out turning, drilling, electrical discharge machining, grinding, hardening operations, etc.

In the present invention, the blank being given its finished shape in two machining steps. This is done by said blank, in a first machining step, being held by at least one first adapter and by a first region being given its final partial shape corresponding to the intended use by a machine tool or milling machine, and by the partly machined blank, in a second machining step, being held by at least one second adapter in the first, finally machined region, and by the remaining region being given its final overall shape corresponding to the intended use by a machine tool or milling machine.

The invention consists in mounting the blank in the first step, for the machining, or in fastening it in the machining space of a machine tool or milling machine by means of an adapter, in such a way that that region of the workpiece which is not concealed as a result of the fastening by the adapter or is not inaccessible as a result of the machining by the machine tool or milling machine is already machined in the first machining step into its final three-dimensional shape corresponding to the intended use. Consequently, this enables the workpiece, for further machining, to be fastened by means of a further adapter which grips the workpiece in certain, already finally machined zones. Of course, the fastening in this case must take place in such a way that the entire region of the partly machined blank which is still unmachined is accessible in an unrestricted manner for the final further machining by the same or another machine tool or milling machine. It is thus then possible in the second machining step, without further resetting, for the partly machined blank to finally be given its overall three-dimensional shape.

This is quite surprising, for the individual machining steps comprise milling operations and also, inter alia, roughing and finishing, which exert considerable forces on the workpiece and which have hitherto always prevented the person skilled in the art from giving the workpiece its final shape in only two setups. Normally, it has always been assumed that the forces produced during the machining lead either to damage to the workpiece or to inadequate quality of the final workpiece (e.g. as a result of vibrations, moments, etc.). However, it has been found that it is possible, in a first machining step, to already give functional surfaces their final shape and to immediately use precisely these functional surfaces for the mounting for the second machining step.

The reduction in setups leads to a considerable simplification in the production process and to cost savings (less downtime, fewer means for the transfer of components, etc.) and nonetheless permits the production of final shapes which meet the highest quality requirements.

The overall shape which is in accordance with the intended use and which can be achieved with the method according to the invention involves any desired component which can be obtained from a blank by the abovementioned operations. The method is especially suitable for the production of components as used in a turbine (steam turbine or gas turbine). Thus the component is preferably a moving or guide blade of a turbine.

According to a first preferred embodiment of the invention, the blank is a blank made of metal or a ceramic material in the form of a cylindrical or polyhedral, in particular preferably parallelepiped-shaped, block or is a cast blank or forged blank. It is likewise possible to feed the blank to the method according to the invention in an already pre-machined form. Surprisingly, the method according to the invention is also successful with such difficult-to-machine components, and this without loss of quality of the final shaped parts.

According to a further preferred embodiment of the invention, the partly machined blank is cleaned and/or measured after the first machining step, for which purpose it is in particular preferably removed in a defined mounting from the machining region of the machine tool or milling machine and cleaned and/or measured in a measuring station. This step between the two actual machining steps permits, on the one hand, final quality control of the already machined region of the workpiece, this in an especially simple manner if the partly machined workpiece is removed in a defined manner from the machining space of the machine tool or milling machine. In this context, "defined manner" means that the means for removing the partly machined workpiece grip the latter at a well-defined location, so that the partly machined workpiece can then be fixed and measured in a likewise well-defined position in a measuring station. This is in particular possible in a very effective manner if, for the defined mounting during the first machining step, defined (temporary) gripping surfaces are prepared in the remaining regions, i.e. in those regions which have not yet been machined into an actual functional surface in the first machining step, via which gripping surfaces transport means, in particular in the form of grippers, and/or mounting means of the measuring station or of a cleaning unit, respectively, in particular in the form of grippers, can mount the partly machined blank in a defined position.

A further preferred embodiment of the invention is characterized in that the final overall shape involves a turbine blade with or without shroud band, in particular a turbine blade having a surface within the range of N4 to N5 at tolerances of ±0.002 mm, a length within a range of 10 to 400 mm, or even up to 2400 mm, with a rotating diameter of 50 to 400 mm and a weight of 0.01 to 40 kg, or even up to 240 kg. In other words, the method can surprisingly be used even in the case of such complex shapes which are very demanding in particular with regard to the quality requirements, and this also within a very large size range (in particular with regard to length), weight range, and also for very small tolerances.

In another preferred embodiment, the final overall shape is cleaned and/or measured and/or packed after the second machining step, as a result of which the component can then be delivered indirectly for storage, dispatch or a fitting process.

A particular embodiment of the method according to the invention works in such a way that the blank is first of all shaped on its one side in the first machining step and is then shaped on its other side in the second machining step. That is to say the first adapter grips the blank at a first end, in the first machining step the second end of the blank is given its final partial shape corresponding to the intended use, the second adapter then grips the partly machined blank at the partial shape and, in the second machining step, the first end is processed into the final overall shape. If the final overall shape involves a turbine blade, the root region is preferably processed in the first machining step, then this root region is used for the mounting for the second machining step, and the tip region is processed in the second machining step. The opposite process can also be realized, in particular in the case of a turbine blade with a shroud band; that is to say that the tip region with shroud band is processed in the first step. In addition, it proves to be advantageous, in this case, in the first machining step, for two defined gripping surfaces in the form of blind holes or recesses to be milled on each of two opposite sides of the blank (of course in such a way that the functional surfaces to be subsequently provided in the second machining step are not affected by these recesses), a first (top) pair being used for the gripping with the gripper for removing the partly machined blank from the machining region of the machine tool or milling machine and for reinserting said partly machined blank, and a second (bottom) pair being used for the defined fixing of the partly machined blank on the measuring station. In this case, if appropriate, in the second machining step, a center hole can be milled on the side remote from the root, and a traversable and/or pivotally mounted tailstock for the mounting can be moved into this center hole at least during some stock removal steps during the second machining step. It can thus be ensured that the moments occurring during such machining can be reduced or that possible vibrations can be prevented.

On the other hand, another particular embodiment of the method works in such a way that the blank is mounted during the first machining step on one side or, if appropriate, at its two ends (via a tailstock), the entire center region of the workpiece is processed except for the respective projecting portions, which if need be are already provided with recesses which already define the terminal regions. This component is then fed to the second machining step and is held via an adapter during this second step in this center region, in which the final functional surfaces are already processed. In other words, the procedure is such that the first adapter grips the blank at a first end, and, if appropriate, the second end is fixed via a traversable and/or pivotally mounted tailstock and a center hole, that, in the first machining step, the center region and, if appropriate, one of the end regions of the blank is given its final partial shape corresponding to the intended use, that the second adapter grips the partly machined blank at the center partial shape and the one end region or, if appropriate, the two end regions are processed into the final overall shape. For example, the partial shape may involve a turbine blade, with unmachined projecting portions being left at the tip part and/or at the root part, recesses being provided between the projecting portions and the turbine blade in particular preferably during the first machining step. In this case, the second adapter advantageously grips the partly machined turbine blade by means of two gripping jaws, the axis of the partly machined turbine blade coming to lie essentially perpendicularly to the fastening axis of the second adapter in the machine tool or milling machine.

According to an additional preferred embodiment, the method is carried out in a machining cell or machining unit which has a plurality of machine tools or milling machines, for example 2, 4 or even 6 or more. That is to say that at least two machine tools or milling machines are used simultaneously in a cell, the blanks, the partly machined blanks and the final overall shapes being fed by means of a handling system via a handling portal and via a central control to machine tools or milling machines available in each case and being subjected to a first or second machining step, respectively, in said machine tools or milling machines. In other words, the handling portal serves the at least two machine tools or milling machines, in which case this can take place in an optimized manner, and thus precisely the problem mentioned at the beginning, which occurs in an arrangement in which a certain function is assigned to a respective machine tool or milling machine, can be avoided. This is because both machine tools or milling machines are able to carry out both the first and the second machining step, and thus the machining means available can always be used in an optimum manner via the central control. In this case, the cell may comprise even further units, thus, for example, at least one measuring unit and/or at least one cleaning unit and/or at least one workpiece buffer location and/or a loading belt (a paternoster is also possible) and/or an adapter magazine and/or a discharge station and/or a washing and preserving unit and/or a material-code-reading station and/or an inscription unit. All of these components are in this case connected to the handling portal, and the central control also assigns the parts to these units in a manner adapted to the respective conditions. If appropriate, a plurality of handling portals may also be arranged, but in any case a plurality of handling systems.

Furthermore, the present invention relates to an apparatus for carrying out the method as described above. In particular, this is an apparatus in which the at least one machine tool or milling machine and, if appropriate, a measuring unit and/or, if appropriate, at least one cleaning unit and/or, if appropriate, at least one workpiece buffer location and/or, if appropriate, at least one loading belt and/or, if appropriate, at least one adapter magazine and/or, if appropriate, at least one discharge station and/or, if appropriate, at least one washing and preserving unit and/or, if appropriate, at least one material-code-reading station and/or, if appropriate, at least one inscription station are served with the blanks, the partly machined blanks and the final overall shapes, in each case possibly already cleaned or measured or packed, via a single handling portal of linear or circular design, in particular in the form of a belt or a rail on which at least one handling system but preferably a plurality of handling systems having in each case at least one gripper are mounted in a traversable manner.

Furthermore, the present invention relates to the use of an apparatus as described above for producing a turbine blade, in particular a turbine blade with or without a shroud band, having a surface within the range of N4 to N5 with tolerances of ±0.002 mm, a length within the range of 10 to 400 mm, with a rotating diameter of 50 to 400 mm, and a weight of 0.01 to 40 kg.

BRIEF DESCRIPTION OF THE DRAWINGS

The invention is to be explained in more detail below with reference to exemplary embodiments and in connection with the figures. In the drawing.

DETAILED DESCRIPTION OF THE PREFERRED EMBODIMENTS

Figure 5B:
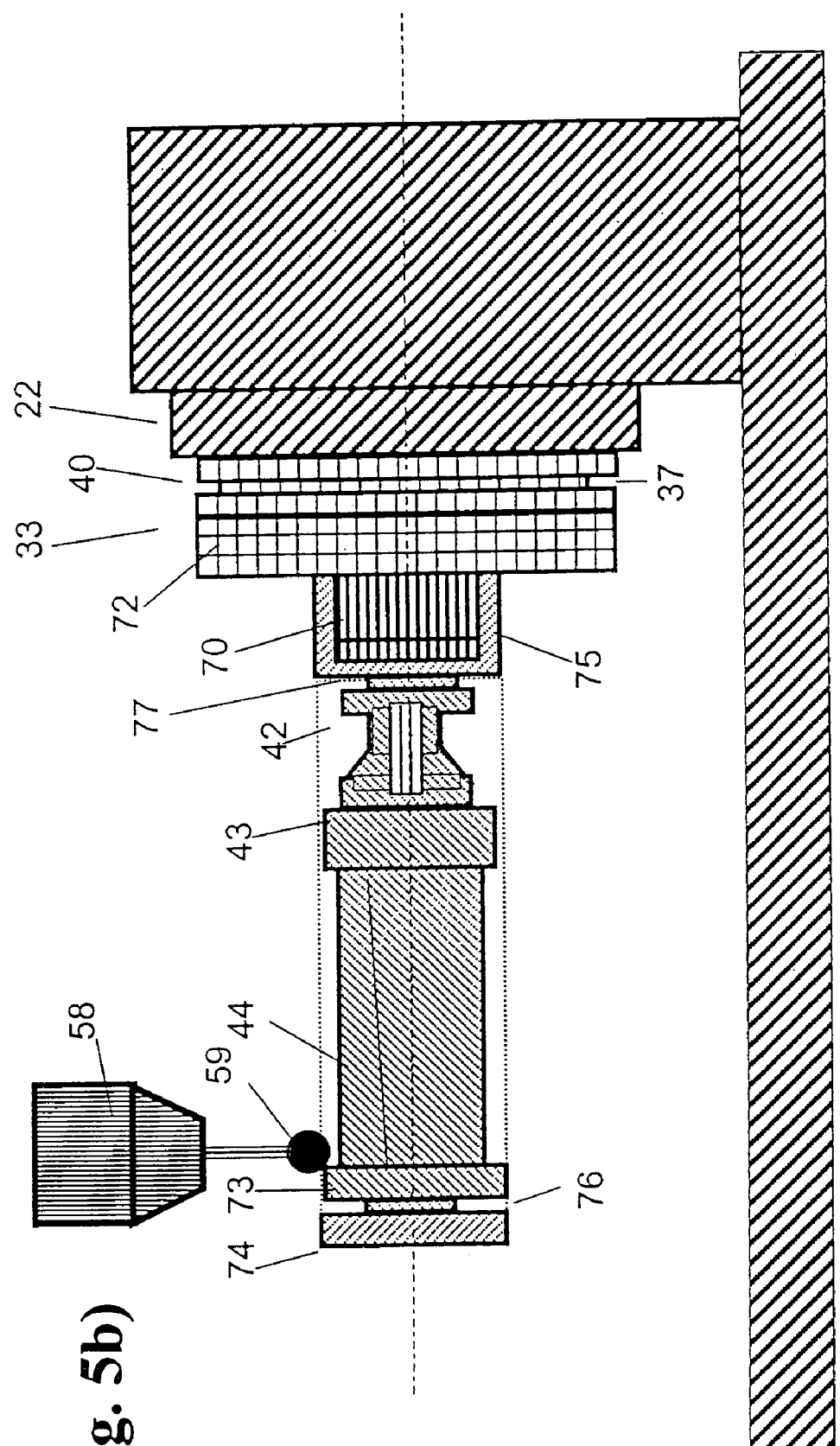
FIG. 5 shows individual machining steps of a blank according to the second exemplary embodiment:
   a) centrally machined blank in the blade milling machine;
   b) measuring of the centrally machined blank in the measuring station;
   c) special gripping adapter with centrally machined blank, clamped in place, from the front;
   d) special gripping adapter with centrally machined blank, clamped in place, from the side;
   e) special gripping adapter with finished blade, clamped in place, from the front;
   f) special gripping adapter with finished blade, clamped in place, from the side.

First of all, possible layouts of cells for the machining according to the invention of workpieces are to be shown and explained with reference to FIGS. 1 to 3, then the actual process sequences of the two essential exemplary embodiments are to be shown and explained with reference to FIGS. 4 and 5.

Figure 1:
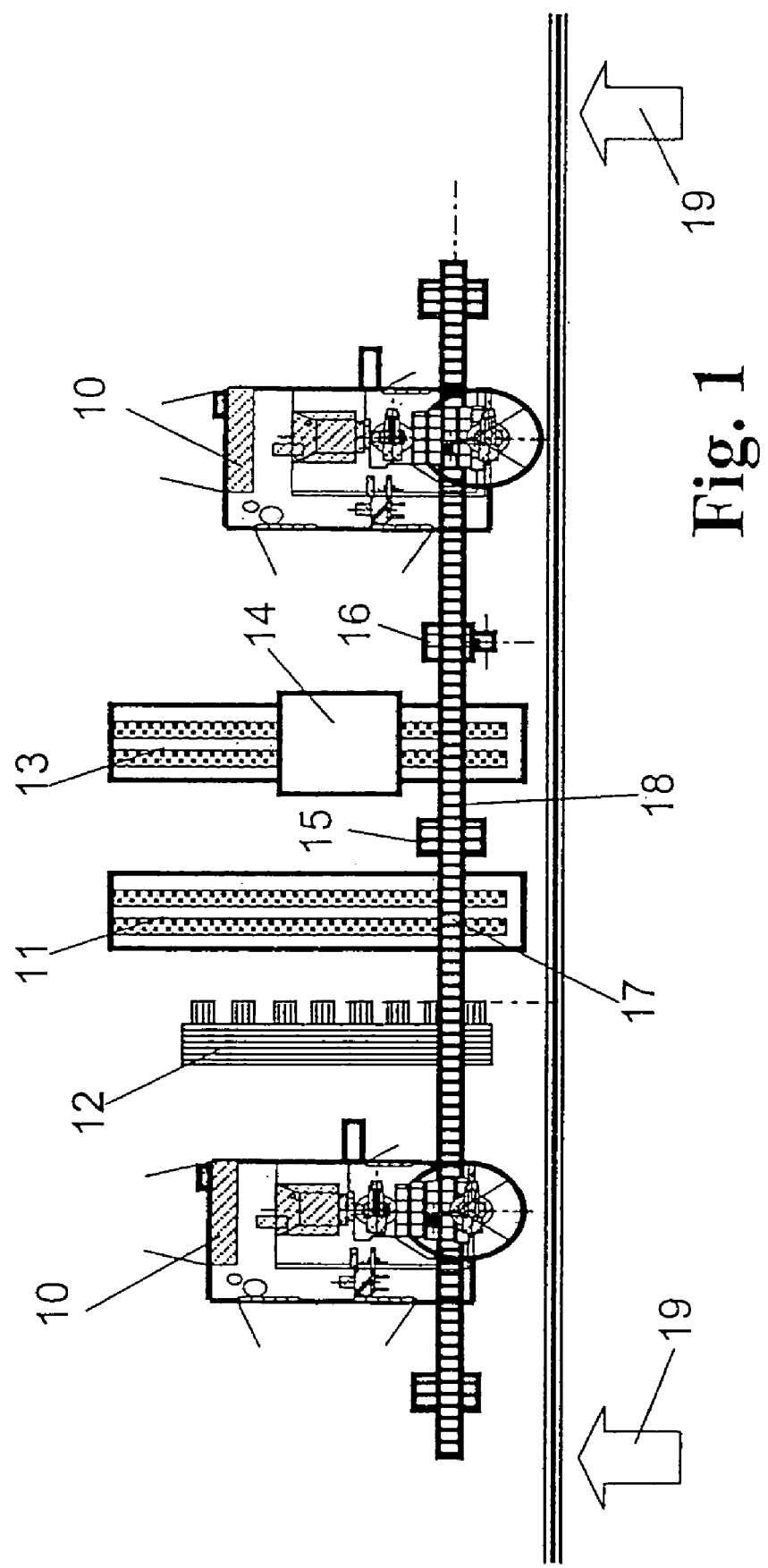
FIG. 1 shows a cell layout with two milling machines.

FIG. 1 shows the layout of a cell from above for carrying out the process according to the invention. This is a small cell having two blade milling machines 10 which are loaded with the workpieces to be machined and are respectively unloaded via a handling portal 18. To this end, the handling portal 18 has a handling system with a gripper 16. If appropriate, a plurality of such handling systems 16 can be mounted on the same handling portal 18 in a traversable manner. The handling portal 18, via further units essentially remote from a working front 19, is supplied with blanks by means of a loading belt 11 in the form of a paternoster. The blanks are gripped by the gripper of the handling system 16, fed to the adapter magazine 12, fixed there in an adapter, fed to a material-code-reading station 15, in which the material code applied to the blank is read, and are then transferred to one of the two blade milling machines 10 for the first machining step. These transfer steps are coordinated and controlled by a central control unit (not shown). This is because the control unit, in accordance with the information which has been determined in the material-code-reading station 15 concerning the material condition of the blank, also activates the assigned blade milling machine, that is to say the milling program adapted to the material is started.

After the first machining step in one of the blade milling machines 10, the partly machined blank is again seized by the handling system 16 and is fed to a washing unit 14, either with or without an adapter (in this case an intermediate stop is made at the adapter magazine 12), is then measured in a measuring station, is mounted at the adapter magazine 12 with an adapter for the second machining step, and is then assigned again to one of the two blade milling machines 10 for the second machining step. This may be either the same blade milling machine which has already carried out the first machining step or else the second blade milling machine. After completion of the second machining step, the now finished workpiece is seized by the handling system 16, washed in the washing station 14, measured, and removed from the cell via a discharge station 13, if need be after additional preserving or packing.

The fact that both milling machines can carry out both the first and the second machining step results in the advantage that the entire production process, i.e. the two machining steps and also washing, measuring, preserving, can in each case be run in an optimum manner via the handling system 16 in such a way as to be regulated and controlled via a control unit. In contrast to "box-type production", the downtimes of the individual units can thus be minimized and the entire process can be carried out more quickly and more efficiently.

Figure 2:
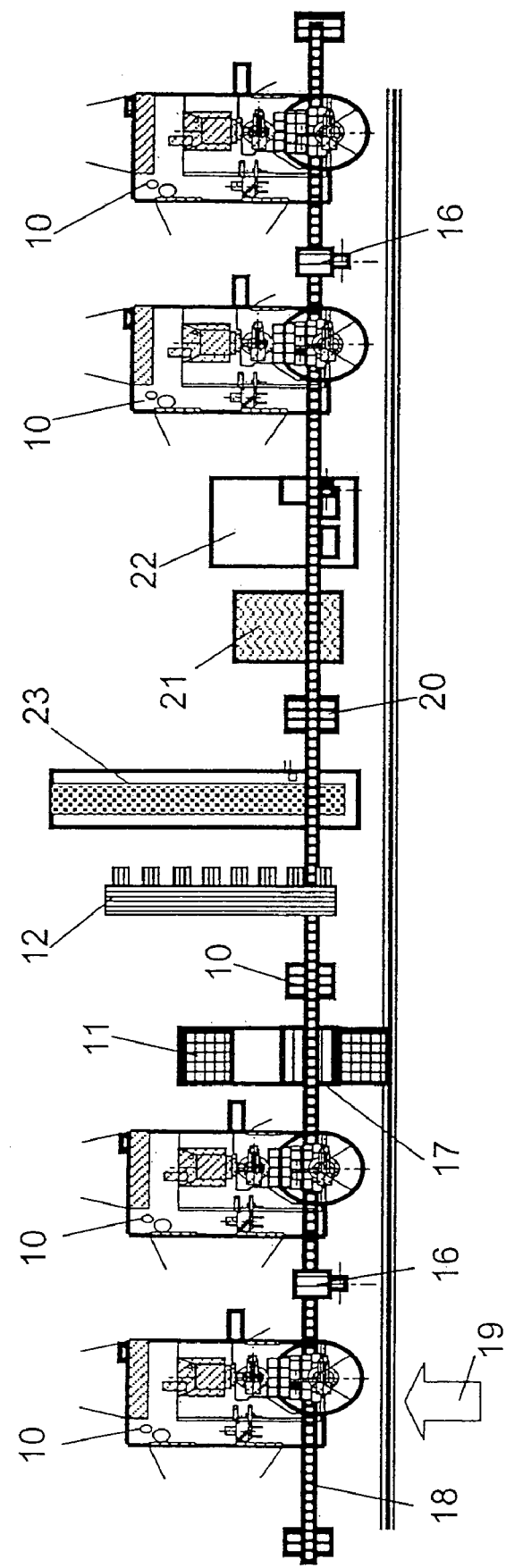
FIG. 2 shows a cell layout with four milling machines.

FIG. 2 shows a corresponding cell of medium size which is of essentially identical construction to the cell in FIG. 1 but which has four blade milling machines 10 and also an inscription unit 20, with which the finally machined, cleaned and fully measured workpiece can be provided with an inscription which enables the workpiece to be clearly assigned to a certain machining cycle and serves to document the quality control effected. In addition, the system has an independently designed cleaning unit 21, preferably in the form of an ultrasonic bath, and also a measuring unit 22 and a discharge station 23. A machining process carried out in a cell according to FIG. 2 is again controlled by a control unit (not shown in the figure).

Figure 3:
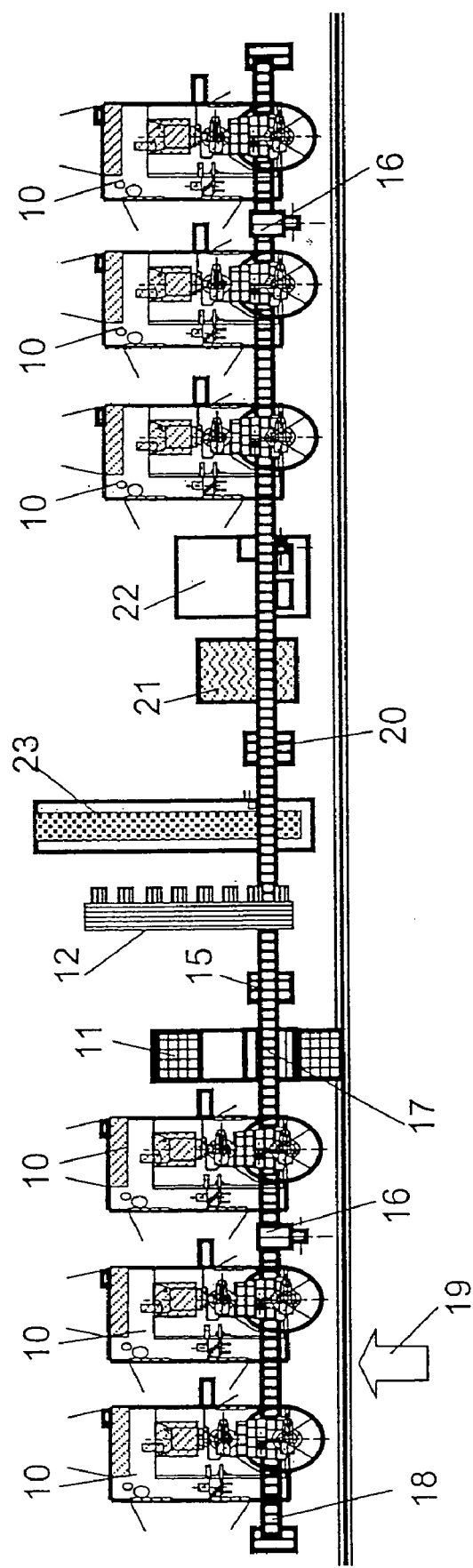
FIG. 3 shows a cell layout with six milling machines.
Figure 4H:
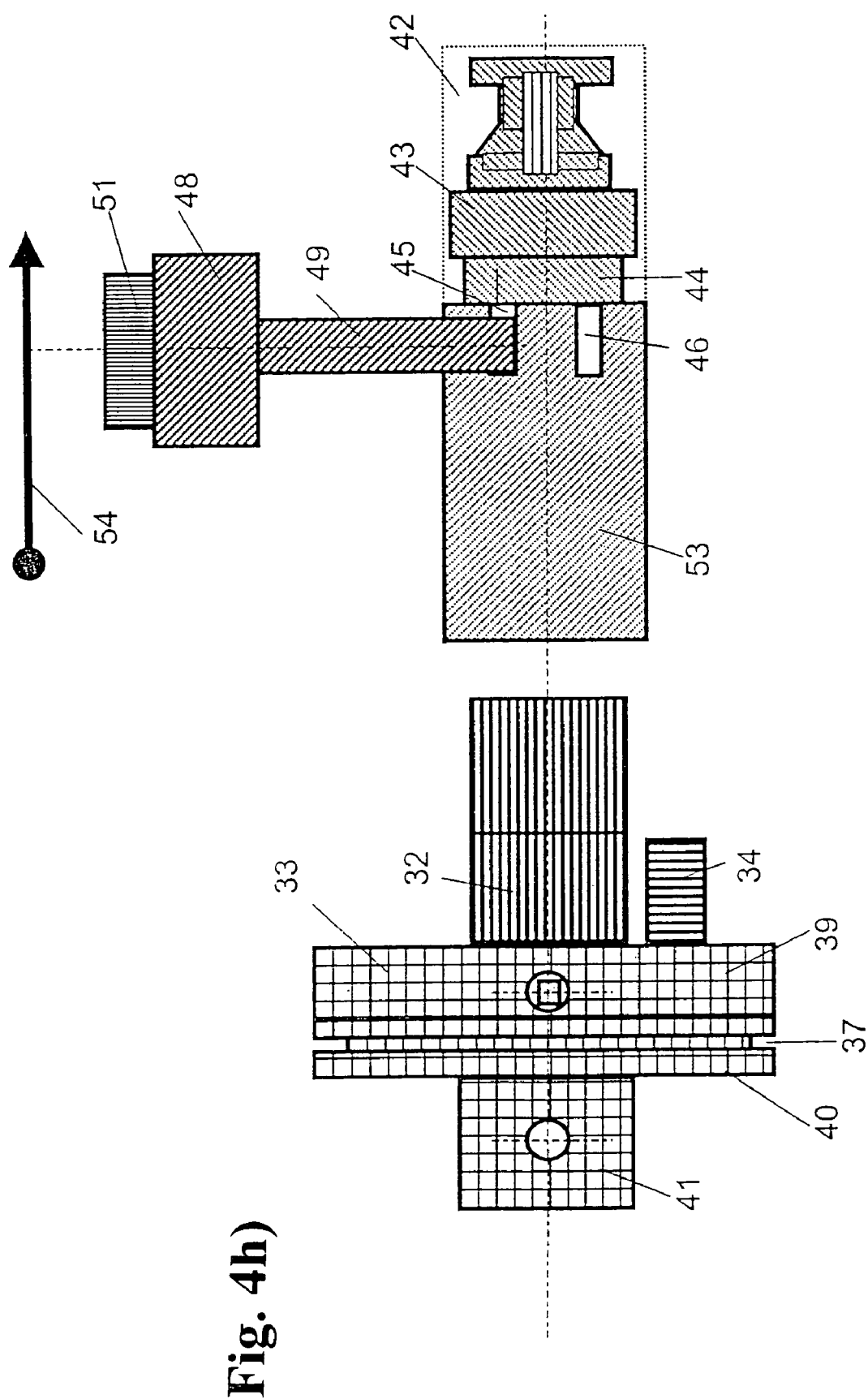
FIG. 4 shows individual machining steps of a blank according to the first exemplary embodiment:
   a) a typical blank to be machined;
   b) a gripping adapter with blank from the front;
   c) a gripping adapter with blank from the side;
   d) a gripping adapter with blank machined on one side from the front;
   e) a gripping adapter with blank machined on one side from the side;
   f) a gripping adapter with blank machined on one side from the front, with engaging gripper;
   g) a gripping adapter with blank machined on one side from the side, with engaging gripper;
   h) operation for releasing from gripping adapter, with gripper;
   i) operation for depositing the blank machined on one side on the measuring station from the front;
   k) operation for depositing the blank machined on one side on the measuring station from the side;
   l) measuring operation on the measuring station from the front;
   m) measuring operation on the measuring station from the side;
   n) insertion of the blank machined on one side into the special gripping adapter by means of the gripper;
   o) fixing of the blank machined on one side in the blade milling machine;
   p) finish-machined blade in the blade milling machine.
Figure 4N:
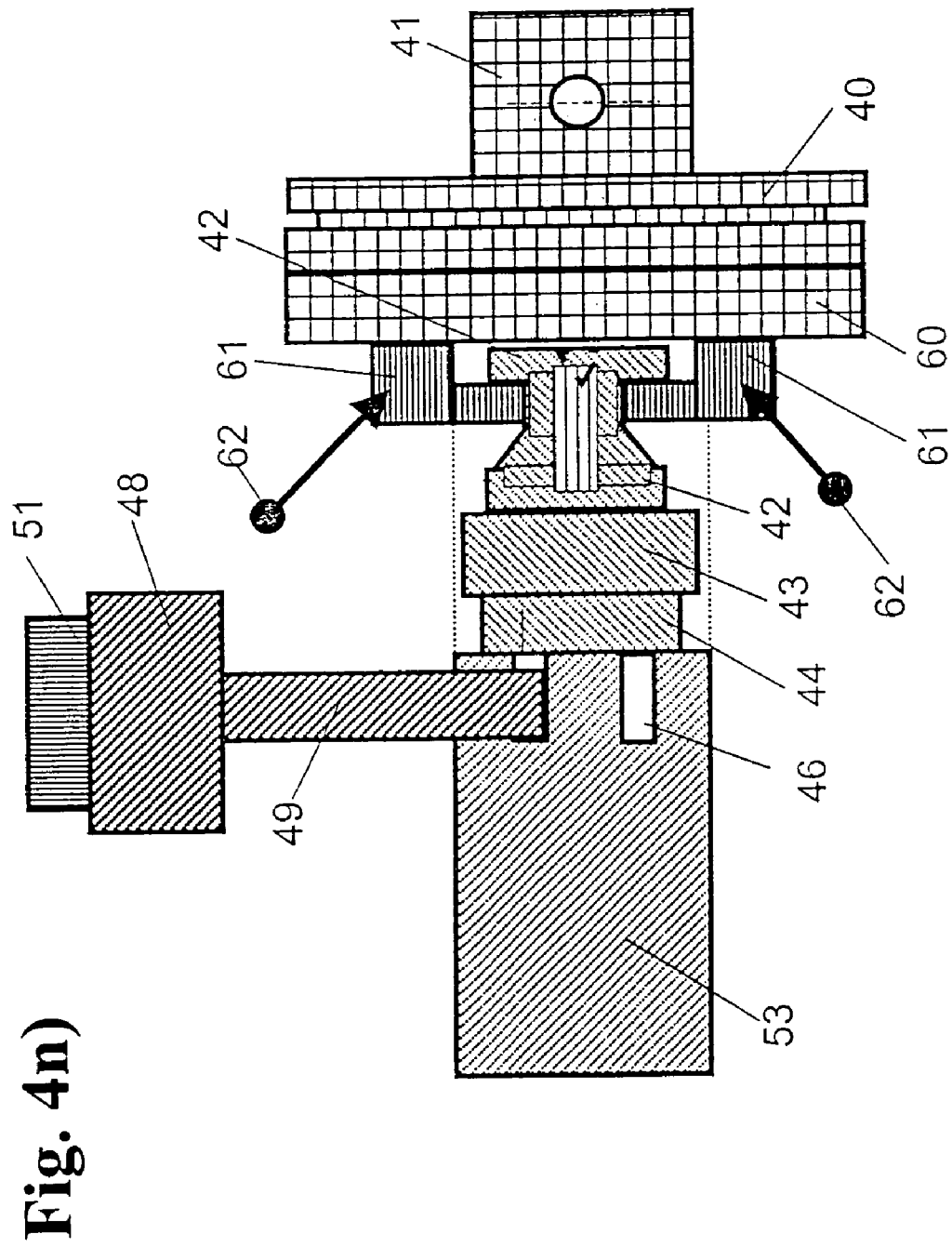
Figure 4O:
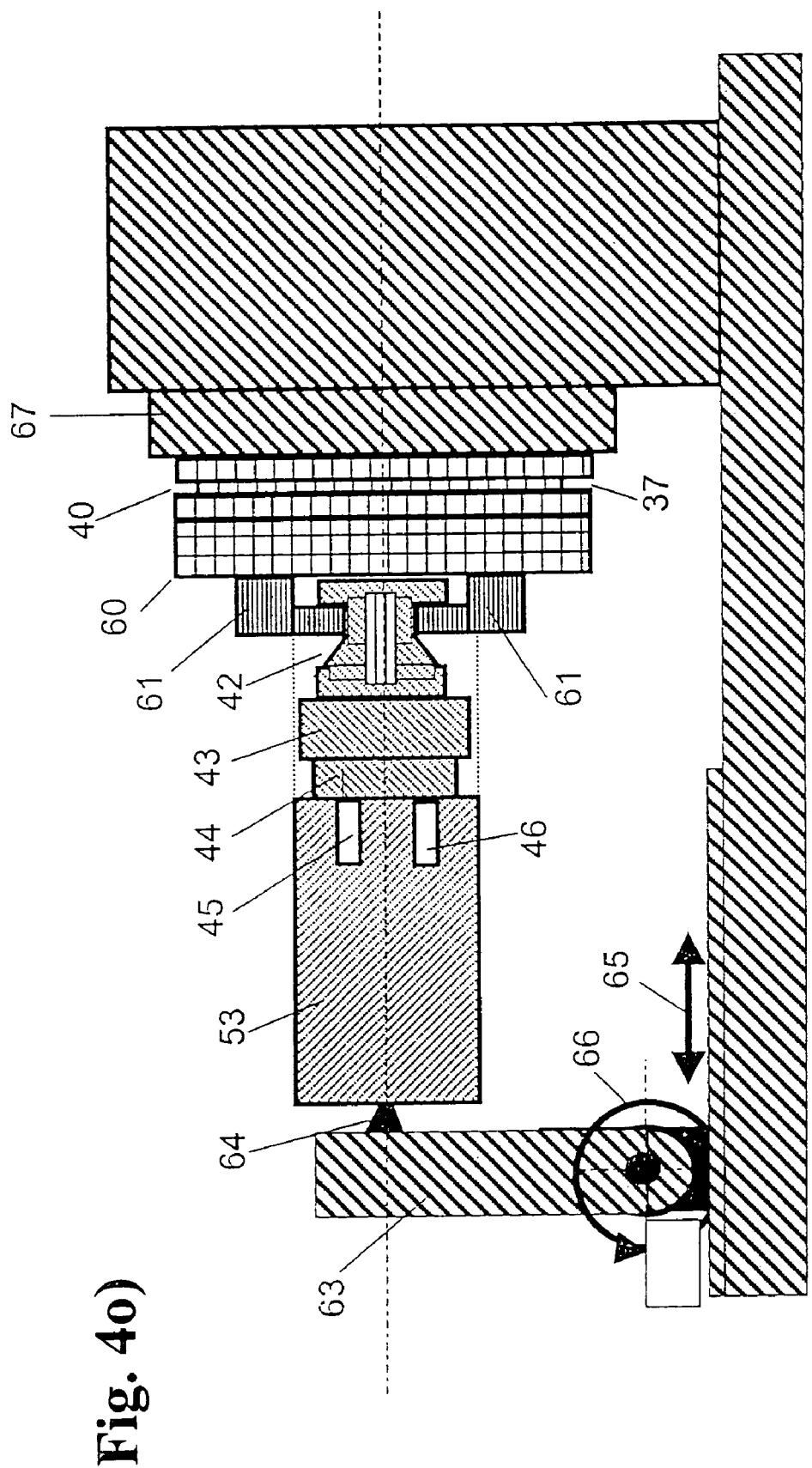
Figure 4P:
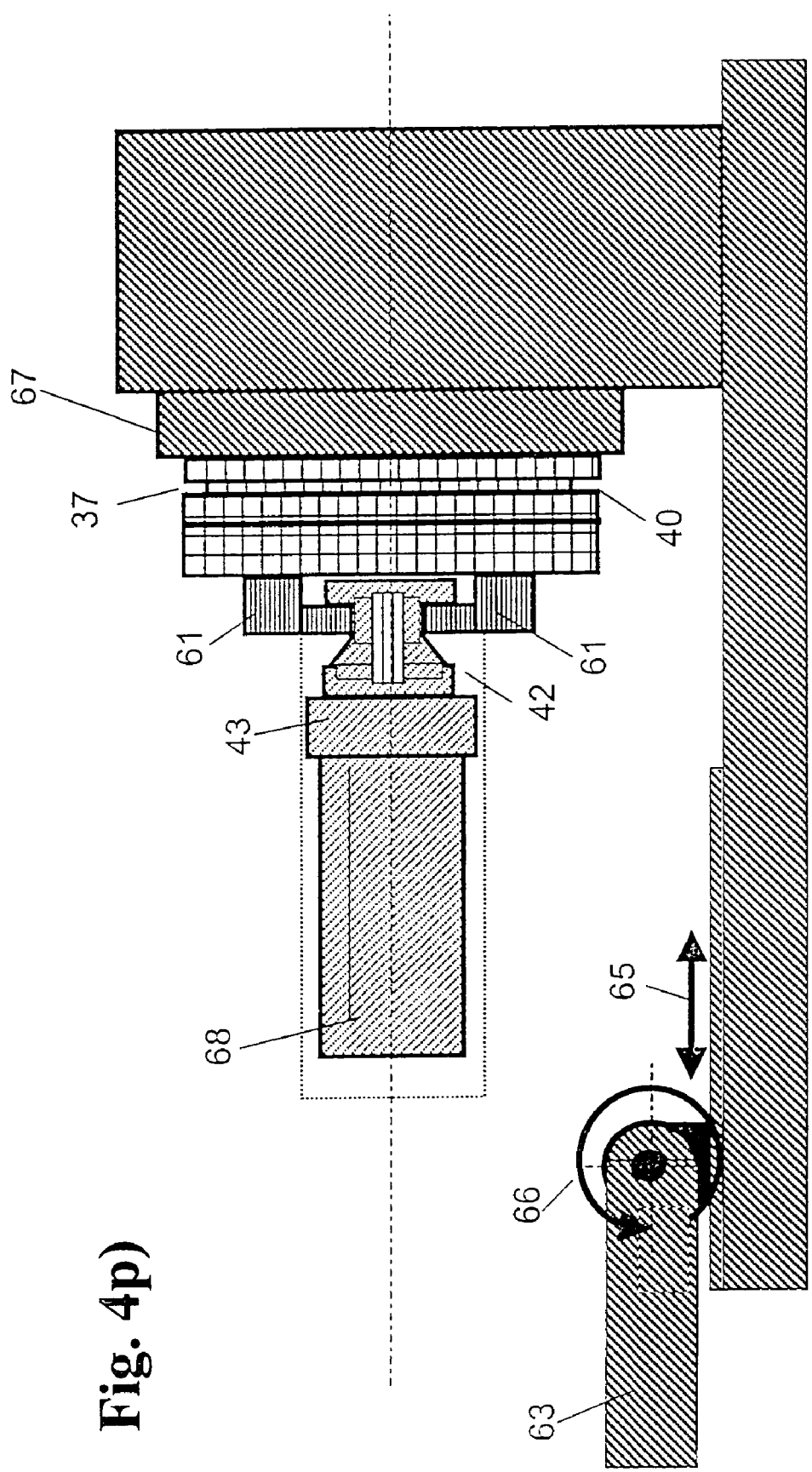

FIG. 3 shows a large cell, which now has six blade milling machines 10, which are all served via the same handling portal 18. Two handling systems 16 are required for this purpose. Cells having more than two milling machines 10 can be controlled in an even more optimum manner via the control unit, this in particular when the individual machining steps are of significantly different length.

The two following figures show two exemplary embodiments of the process according to the invention, the second for the production of turbine blades of any kind, such as, for example, moving or/and guide blades compressor blades, steam turbine blades, hot-gas blades, etc.

FIG. 4a) shows a blank 30 in the form of a parallelepiped. However, the blank 30 may also be round or have any other desired cross section. The blanks may also be rough forging blanks or cast blanks. Such a blank 30 is normally provided with a material code 31 for quality assurance (digits, letter code laser-cut, punched, rotationally stamped).

Depending on the blade type and in particular on the blade length, the method steps cited below are used in the same flexible production cell (cf. FIGS. 1 to 3).

1. The blank 30 is placed on a loading belt 11 (paternoster) or a loading ramp, with which it passes to the handling system 16 at a transfer location 17.

2. Here, the blank 30 is oriented with respect to the defined transfer position 17.

3. After that, the blank 30 is clamped with a gripper of one of the two handling systems 16 running on a handling portal 18 and is brought to a material-code-reading station 15 by means of the handling system 16.

4. The material code is read and signaled to the production control system, the control unit of the cell.

5. In this way, the blank 30 is recorded in a clearly defined manner and assigned a production number and series number. It is subsequently written on a defined surface by means of an inscription station 20. With the latter, the blade and its quality data (documents) as well as all the production steps covered and their settings can be reproduced in a clearly defined manner, which is of great importance for the retrofit case.

6. After that, the blank 30 is brought to one of the blade milling machines 10 by means of the handling system 16.

7. The blank 30 is then pushed by means of the ram of the handling system 16 into the loading and unloading region of the blade milling machine 10 at clamping level and then into a special gripping adapter 33, as shown in FIGS. 4b) and c). Here, it is fixed and clamped in a clearly defined manner by a gripping and clamping system. For this purpose, the gripping adapter 33 is fixed and clamped in a clearly defined manner in an adapter changer (in the loading and unloading region of the blade milling machine). In this case, the gripping adapter 33 consists of two gripping jaws 32 which have a jaw clamping stroke 35 and clamp the blank 30 laterally. A clamping screw mechanism 38 is provided for the movement of the gripping jaws 32. For a fixed limit at the bottom, the gripping adapter 33 has a movable stop 34 which has a stroke 36. The adapter 33 itself is split in two as it were and has a mounting part 40 not specific to the component (e.g. standard HSK) which is provided with a clamping cylinder 41 for fixing in the chuck of the blade milling machine 10. In addition, the adapter 33 has a top part 39 which is specific to the component and carries the abovementioned gripping jaws 32. In addition, one of the two elements of the adapter 33 has a gripper channel 37 which serves either to transfer the adapter 33 to the gripper in a well-defined position or to mount it in the adapter magazine.

8. The gripper of the handling system is released and moved out of the loading and unloading region of the blade milling machine 10. It is assigned other tasks by the control system.

9. By means of the adapter changer, the gripping adapter 33 with the clamped blank 30 is then introduced as replacement into the A rotary axis of the machine tool, which is located in the working space of the machine. (Principle as during tool change.)

10. Here, the complete root part 42 and 43 of the turbine blade to be produced is then produced with the corresponding NC programs and tools (cf. FIGS. 4d) and e)). Furthermore, in the case of longer turbine blades, a part of the duct or airfoil contour 44 is rough-milled or finish-milled.

11. Finally, on two opposite sides of the outer contour of the blank 30, in the unmachined part 53, in each case two defined gripping surfaces 45 and 46 are produced for the subsequent gripper transfer and fixing of the measuring position (cf. FIGS. 4d) and e)).

12. After that, the turbine blade thus semifinished (root part is ready for fitting) is swung into the loading and unloading region of the blade milling machine again by means of the adapter changer.

13. The gripper 48 of the handling system 16 is then moved into the loading and unloading region of the blade milling machine and fixes and clamps the blank 30 in the two top gripping surfaces 45 by means of the two gripping arms 49, which have a clamping stroke 50 (cf. FIGS. 4f) and g)). After that, the clamping of the blank 30 in the gripping adapter 33 is released and the handling system 16 moves the semifinished blank clamped in the gripper 48 out of the gripping adapter 33 and out of the loading and unloading region of the blade milling machine (cf. FIG. 4h)).

14. By means of the handling system 16, the semifinished blank is brought into an ultrasonic bath 21 for cleaning. Here, the semifinished blank and part of the gripper are cleaned.

15. After the cleaning, the semifinished blank is brought by means of the handling system 16 to the measuring position, which is located on the measuring machine 22.

16. Here, the semifinished blank is fixed and clamped in the two bottom gripping surfaces 46 in a special gripping and clamping station 56 (cf. FIGS. 4*i*) and *k*)). After that, the gripper 49 is released and moved by means of the handling system 16 out of the working region of the measuring machine 22. It is assigned other tasks by the control system.

17. In this measuring position, the complete root part and here in particular the subsequent functional surfaces are measured with a measuring probe 58 having a measuring head 59 (cf. FIGS. 4*l*) and *m*)). The measuring reports are prepared by the measuring machine and transmitted to the control system. Furthermore, correction sizes, if appropriate, for further root machining are prepared and directed by means of the control system to the relevant blade milling machine in order to carry out the relevant NC program corrections here. Furthermore, reference size corrections are transmitted via the control system to the following duct or airfoil machine tool.

18. After the measuring of the turbine blade root, the semifinished blank or the semifinished blade is fixed and clamped in the two top gripping surfaces 45 by means of the gripper 48 of the handling system 16. The clamping in the special gripping and clamping station 56 is released and the semifinished blank is brought into the loading and unloading region of the blade milling machine 10 by means of the handling system 16.

19. Here, the handling system 16, in the gripper 48 of which the semifinshed blank is clamped, pushes the semifinished blank or the root part of the semifinished turbine blade in a defined manner into a special gripping adapter 60 in such a way that the root part can be fixed and clamped in a clearly defined manner by means of the shaped gripping elements 61 of the special gripping adapter 60. The adapter is again of two-piece design, having a mounting part 40 not specific to the component (e.g. with HSK cylinder) and having a top part 60. The special gripping adapter 60 has special jaws 61 which are adapted to the respective workpiece and which, in the case shown in FIG. 4*n*), also have a special jaw gripping stroke 62, so that the root part 42 can be fixed in an optimum manner. The special gripping adapter is fixed and clamped in a clearly defined manner in an adapter changer in the loading and unloading region of the blade milling machine.

20. By means of the adapter changer, the special gripping adapter 60, with the semifinished turbine blade, is then introduced as replacement into the A rotary axis of the blade milling machine 10, which is located in the working space of the machine. (Principle as during tool change.)

21. Here, if necessary, in the first step, a center hole is provided on the free tip end of the semifinished blank. In most cases, this is done by a centering operation.

22. If a center hole is provided, the tailstock center 64 of a tailstock 63, by swinging around and traversing said tailstock 63, is then moved into the center hole and the semifinished workpiece is thus fixed and axially restrained in a clearly defined manner (cf. FIG. 4*o*)).

23. If the steps 21 to 22 are not necessary for the specific turbine blade, they may be omitted.

24. After that, in the case having a center hole, the complete duct or airfoil part of the turbine blade to be produced is then produced by means of the corresponding NC programs and tools.

25. To produce the tip part, the tailstock center 64 is then moved out of the center hole and the tailstock center 63 is tilted back along 66, so that the tip part becomes freely accessible (cf. FIG. 4*p*)).

26. In the case of semifinished workpieces without a center hole, the tip part is produced immediately following the production of the duct or airfoil part by appropriate NC programs and tools.

27. After that, the thus completed turbine blade 68 is swung back again into the loading and unloading region of the blade milling machine 10 by means of the adapter changer.

28. The gripper 48 of the handling system 16 is then moved into the loading and unloading region of the blade milling machine 10 and fixes and clamps the special gripping adapter 60 having the finished turbine blade 68 at a specific position, so that it can bring the special gripping adapter 60 out of the loading and unloading region of the blade milling machine after it has been released from its clamping.

29. By means of the handling system 16, the special gripping adapter 60 with the finished turbine blade 68 is brought into an ultrasonic bath 21 for cleaning. Here, it and the turbine blade 68 and part of the gripper 48 are cleaned.

30. After the cleaning, the turbine blade 68 is brought by means of the handling system 16 to the measuring position, which is located on the measuring machine 22.

31. Here, the special gripping adapter 60 with the finished turbine blade 68 is fixed and clamped in a special gripping station. After that, the gripper 48 is released and moved by means of the handling system 16 out of the working region of the measuring machine 22. It is assigned other tasks by the control system.

32. In this measuring position, the complete turbine blade 68 is measured. The measuring reports are prepared by the measuring machine 22 and transmitted to the control system. Furthermore, correction sizes, if appropriate, for further duct machining are prepared and directed by means of the control system to the relevant blade milling machine in order to carry out the relevant NC program corrections here. The blade documentation is then completed with these measuring data.

33. After the measuring of the turbine blade, the special gripping adapter 60 with the finished turbine blade 68, after the release of said special gripping adapter 60 in the special gripping station, is brought to the inscription station 20 by means of the gripper 48 of the handling system 16. Here, the finished turbine blade is provided with a clearly defined reproducible code by a laser method, engraving method or another inscription method.

34. After the inscription station 20, the special gripping adapter 60 with the finished turbine blade 68 is brought to the discharge clamping station by means of the gripper 48 of the handling system 16. Here, the special gripping adapter 60 is fixed and clamped in a clamping receptacle. The gripper 48 releases the special gripping adapter 60.

35. The shaped gripping elements 61 are released by an unlocking unit, so that the ready-to-use turbine blade 68 falls downward into a receiving container of the washing and preserving unit 14 or 21, respectively. If this is not effected automatically, the removal and insertion of the turbine blade 68 can also be effected by means of the gripper 48 of the handling system 16.

36. As a last step, the turbine blade 68 is transported through the washing and preserving unit 14, where it is washed and, if necessary, preserved.

37. If longer transport to a remote assembly location is involved, a packing welding station, where the turbine blade is welded in position for the further transport, is provided downstream of the normal discharge station, where the turbine blade is normally put into a detent pallet.

In summary, the method, in which first of all the one end and then the other end is machined and as shown in FIG. 4, comprises the following steps:

Charge blank
Read test number of blank
Place blank in machine
Root machining
Remove workpiece and insert new part
Clean workpiece
Insert in measuring machine
Measure root (calculate corrections and transmit to machine)
Remove workpiece from measuring machine and insert into next machine
Airfoil and tip machining
Remove workpiece with adapter
Clean workpiece
Insert into measuring machine
Measure airfoil and tip (calculate corrections and transmit to machine)
Remove workpiece
Inscribe workpiece
Discharge workpiece (remove from adapter at washing machine)

FIG. 5 shows another exemplary embodiment of the method according to the invention, in which the center region of the workpiece is machined in the first machining step and the two end regions (or only one end region) (final gripping at the rhombic surfaces) are machined in the second machining step. In its entirety, the method comprises the following steps:

1. The blank 30 is placed on a loading belt 11 (paternoster) or a loading ramp, with which it passes to a transfer location 17 at the handling system 16.

2. Here, the blank 30 is oriented with respect to the defined transfer position 17.

3. After that, the blank 30 is clamped with a gripper of one of the two handling systems 16 running on a handling portal 18 and is brought to a material-code-reading station 15 by means of the handling system 16.

4. The material code is read and signaled to the production control system, the control unit of the cell.

5. In this way, the blank 30 is recorded in a clearly defined manner and assigned a production number and series number. It is subsequently written on a defined surface by means of an inscription station 20. With the latter, the blade and its quality data (documents) as well as all the production steps covered and their settings can be reproduced in a clearly defined manner, which is of great importance for the retrofit case.

6. After that, the blank 30 is brought to one of the blade milling machines 10 by means of the handling system 16.

7. The blank 30 is then pushed by means of the ram of the handling system 16 into the loading and unloading region of the blade milling machine 10 at clamping level and then into a special gripping adapter 33, as shown in FIG. 5a). Here, it is fixed and clamped in a clearly defined manner by a gripping and clamping system. For this purpose, the gripping adapter 33 is fixed and clamped in a clearly defined manner in an adapter changer in the loading and unloading region of the blade milling machine 10. In this case, the gripping adapter 33 consists of two gripping jaws 70 which have a jaw clamping stroke 71 and clamp the blank 30 laterally. A clamping screw mechanism (not shown), for example, is provided for the movement of the gripping jaws 32. For a fixed limit at the bottom, the gripping adapter 33 may also have a movable stop as in the previous exemplary embodiment. The adapter 33 itself is split in two as it were and has a mounting part 40 not specific to the component (e.g. standard HSK) which is provided with a clamping cylinder 41 for fixing in the chuck of the blade milling machine 10. In addition, the adapter 33 has a top part 72 which is specific to the component and carries the above-mentioned gripping jaws 70. In addition, one of the two elements of the adapter 33 has a gripper channel 37 which serves either to transfer the adapter 33 to the gripper in a well-defined position or to mount it in the adapter magazine.

8. The gripper of the handling system is released and moved out of the loading and unloading region of the blade milling machine 10. It is assigned other tasks by the control system.

9. By means of the adapter changer, the gripping adapter 33 with the clamped blank 30 is then introduced as replacement into the A rotary axis of the machine tool, which is located in the working space of the machine. (Principle as during tool change.)

10. Here, if necessary, in the first step, a center hole is provided on the free tip end of the blank 30. In most cases, this is done by a centering operation.

11. If a center hole is provided, the tailstock center 64 of a tailstock 63, by swinging around and traversing said tailstock 63, is then moved into the center hole and the blank 30 is thus fixed and axially restrained in a clearly defined manner.

12. If the steps 10 to 11 are not necessary for the specific turbine blade, they may be omitted.

13. After that, in the case with or without a center hole, the complete turbine blade (root, duct, airfoil, tip part) of the turbine blade to be produced is produced by means of appropriate NC programs and tools. A recess 76 and 77 is milled on the root and tip sides, so that the remaining parts 74 and 75 of the blank can subsequently be milled (cf. FIG. 5a)).

14. After that, the virtually finished turbine blade is swung into the loading and unloading region of the blade milling machine again by means of the adapter changer.

15. The gripper of the handling system is then moved into the loading and unloading region of the blade milling machine and fixes and clamps the gripping adapter 33 having the almost finished turbine blade at a specific position, so that it can bring the gripping adapter 33 out of the loading and unloading region of the blade milling machine after it has been released from its clamping.

16. By means of the handling system 16, the gripping adapter 33 with the almost finished turbine blade is brought into an ultrasonic bath 21 for cleaning. Here, the gripping adapter 33 with the almost finished turbine blade and part of the gripper are cleaned.

17. After the cleaning, the gripping adapter 33 with the virtually finished turbine blade is brought by means of the handling system 16 to the measuring position, which is located on the measuring machine 22 (cf. FIG. 5b)).

18. Here, the gripping adapter 33 with the virtually finished turbine blade is fixed and clamped in a special gripping station. After that, the gripper is released and moved by means of the handling system 16 out of the working region of the measuring machine 22. It is assigned other tasks by the control system.

19. In this measuring position, the complete turbine blade is measured. The measuring reports are prepared by the measuring machine 22 and transmitted to the control system. Furthermore, correction sizes, if appropriate, for further duct machining are prepared and directed by means of the control system to the relevant blade milling machine in order to carry out the relevant NC program corrections here.

20. The blade documentation is then completed with these measuring data.

21. The gripper of the handling system 16 is then moved into the measuring machine 22 and, after the release of the gripping adapter 33, removes the virtually finished and measured turbine blade and fixes the latter in the second position in a clamped manner on the special gripping adapter 78 (cf. FIG. 5*c*). In the process, the virtually finished turbine blade comes to lie transversely to the axis of the special gripping adapter 78 and is fixed by two interchangeable gripping jaws 79 which have a clamping stroke 80 and are displaceable relative to one another along 81. In this case, the fixing is effected on the rhombic surfaces of the virtually finished turbine blade.

22. After it has been oriented, the turbine blade is then finally clamped in the special gripping adapter 78. After that, the virtually finished produced turbine blade is moved out of the measuring machine 22 by means of the gripper of the handling system 16 and brought to the blade milling machine.

24. The gripper of the handling system is then moved into the loading and unloading region of the blade milling machine and fixes and clamps the special gripping adapter 78 with the virtually finished turbine blade in the adapter changer.

25. By means of the adapter changer, the special gripping adapter 78 with the virtually finished turbine blade is introduced as replacement into the A rotary axis of the machine tool, which is located in the working space of the machine. (Principle as during tool change.)

26. After that, the tip and root parts of the turbine blade are then finish-milled by means of appropriate NC programs and tools (cf. FIGS. 5*e*) and *f*)).

27. After that, the special gripping adapter 78 with the finished turbine blade is swung back again into the loading and unloading region of the blade milling machine 10 by means of the adapter changer.

28. The gripper of the handling system is then moved into the loading and unloading region of the blade milling machine and fixes and clamps the special gripping adapter 78 having the finished turbine blade, so that it can bring the special gripping adapter 78 out of the loading and unloading region of the blade milling machine after it has been released from its clamping.

29. By means of the handling system 16, the special gripping adapter 78 with the finished turbine blade is brought into an ultrasonic bath 21 for cleaning. Here, the special gripping adapter with the finished turbine blade 82 and part of the gripper are cleaned.

30. After the cleaning, the special gripping adapter 78 with the finished turbine blade 82 is brought by means of the handling system 16, if again necessary, to the measuring position, which is located on the measuring machine 22.

31. In this measuring position, the remaining part of the turbine blade 82, if necessary, is measured. The measuring reports are prepared by the measuring machine and transmitted to the control system. Furthermore, correction sizes, if appropriate, for further tip and root machining are prepared and directed by means of the control system to the relevant blade milling machine in order to carry out the relevant NC program corrections here.

32. The blade documentation is then completed with these tip and root measuring data.

33. After the measuring of the turbine blade, the special gripping adapter 78 with the finished turbine blade 82, after the release of said special gripping adapter 78 in the special gripping station, is brought to the inscription station 20 by means of the gripper of the handling system 16. Here, the finished turbine blade 82 is provided with a clearly defined reproducible code by a laser method, engraving method or another inscription method.

34. After the inscription station 20, the special gripping adapter 78 with the finished turbine blade 82 is brought to the discharge clamping station by means of the gripper of the handling system 16. Here, the special gripping adapter is fixed and clamped in a clamping receptacle. The gripper releases the special gripping adapter.

35. The shaped gripping elements 79 are released by an unlocking unit, so that the ready-to-use turbine blade falls downward into the receiving container of the washing and preserving unit. If this is not effected automatically, the removal and insertion of the turbine blade 82 can also be effected by means of the gripper of the handling system.

36. As a last step, the turbine blade is transported through the washing and preserving unit, where it is washed and, if necessary, preserved.

37. If longer transport to a remote assembly location is involved, a packing welding station, where the turbine blade is welded in position for the further transport, is provided downstream of the normal discharge station 13, where the turbine blade is normally put into a detent pallet.

The individual production processes can be assigned to all the blade milling machines by the control system according to requirements. Fixed assignment as described above is not absolutely necessary.

If all the operation stations are covered to point 14, the workpiece can also be temporarily stored in a workpiece buffer location.

If all the operation stations are covered to point 28, the workpiece can also be temporarily stored in the adapter magazine 12.

The abovementioned method is suitable for producing turbine blades of the following specification:

| Blade quality: | surface tolerances | N4–N5 +/−0.002 mm |
|---|---|---|
| Dimensions: | length | >10 mm <400 mm or <800 mm |
| | rotating diameter | >50 mm <400 mm or <800 mm |
| | weight | >0.01 kg <40 kg or <140 kg |

The method permits the production of a turbine blade in two production and measuring steps; the turbine blade is ready for fitting and documented with regard to quality at the end. All transport, gripping operations, measuring correction cycles, etc., take place within the cell. A blade documented with regard to quality and preserved if necessary can then be removed from the discharge station.

It is found that the throughput time of a series with the method proposed above is less than one day, whereas substantially more than one day and up to 14 days are necessary with conventional production of a turbine blade.

List of Designations
10 Blade milling machine
11 Loading belt
12 Adapter magazine
13 Discharge station
14 Washing and preserving unit 15 Material-code-reading station
16 Handling system with gripper
17 Transfer position
18 Handling portal
19 Working front
20 Inscription unit
21 Cleaning unit (ultrasound)
22 Measuring unit
23 Discharge station
30 Blank
31 Material code
32 Gripping jaws
33 Gripping adapter for blank
34 Movable stop
35 Jaw clamping stroke
36 Stroke of 34
37 Gripper channel for changer
38 Clamping screw mechanism
39 Top part of 33 specific to component
40 Mounting part of 33 not specific to component
41 Clamping cylinder of 41
42 Root geometry
43 Rhombic geometry
44 Duct/airfoil region
45 Top defined clamping surfaces
46 Bottom defined clamping surfaces
47 Surface for blade code
48 Gripper
49 Gripping arms of 48
50 Gripping stroke of 49
51 Handling ram
52 Handling or gripper z stroke
53 Unmachined parts of the blank
54 Withdrawal direction of the gripper
55 Handling stroke
55 Gripper pince
57 Gripping stroke of 56
58 Measuring probe
59 Measuring head
60 Special gripping adapter
61 Special jaws
62 Jaw gripping stroke of 61
63 Tailstock
64 Centering nose
65 Displaceability of 63
66 Tilting of 63
67 A axis of the blade milling machine
68 Finished blade
70 Gripping jaws
71 Jaw clamping stroke
72 Top part of 33 specific to component
73 Tip part of the blade
74 Unmachined projecting portion at the tip part of the blade
75 Unmachined projecting portion at the root part of the blade
76 Recess at the tip part
77 Recess at the root part
78 Special gripping adapter
79 Interchangeable gripping jaws
80 Clamping stroke of 79
81 Displacement of 79
82 Finished blade

What is claimed is:

1. A method of milling a blank from all directions using at least one rotating machine tool, the method comprising:
a first milling step in which the blank is held by at least one first adapter and a first region proximate a first end of the blank is given a final partial shape by the machine tool, with the final partial shape corresponding to an intended use; and
a second milling step in which the partly machined blank is held in the first region by at least one second adapter, and a remaining region is given a final overall shape by the machine tool corresponding to the intended use.

2. The method of claim 1, wherein:
the blank is made of a material selected from the group consisting of metal and ceramic; and
the blank has a shape selected from the group consisting of cylindrical and polyhedral.

3. The method of claim 2, wherein the blank has a parallelepiped shape.

4. The method of claim 2, wherein the blank is cast.

5. The method of claim 2, wherein the blank has not been subjected to a pre-machining step.

6. The method of claim 1, further comprising:
removing the partly machined blank in a defined mounting from a machining region of the machine tool; and
cleaning the partly machined blank after the first milling step.

7. A method of machining a blank from all directions using at least one machine tool, the method comprising:
a first machining step in which the blank is held by at least one first adapter and a first region is given a final partial shape by the machine tool, with the final partial shape corresponding to an intended use;
a second machining step in which the partly machined blank is held in the first region by at least one second adapter, and a remaining region is given a final overall shape by the machine tool corresponding to the intended use;
removing the partly machined blank in a defined mounting from a machining region of the machine took
cleaning the partly machined blank after the first machining step; and
preparing defined gripping surfaces in the remaining region for the defined mounting during the first machining step.

8. The method of claim 7, further comprising:
mounting the partly machined blank in a defined position for the cleaning thereof.

9. The method of claim 8, wherein the mounting occurs within grippers.

10. The method of claim 1, further comprising:
removing the partly machined blank in a defined mounting from a machining region of the machine tool; and
measuring the partly machined blank in a measuring station after the first milling step.

11. A method of machining a blank from all directions using at least one machine tool, the method comprising:
a first machining step in which the blank is held by at least one first adapter and a first region is given a final partial shape by the machine tool, with the final partial shape corresponding to an intended use;
a second machining step in which the partly machined blank is held in the first region by at least one second adapter, and a remaining region is given a final overall shape by the machine tool corresponding to the intended use;
removing the partly machined blank in a defined mounting from a machining region of the machine tool;
measuring the partly machined blank in a measuring station after the first machining step; and preparing defined gripping surfaces in the remaining region for the defined mounting during the first machining step.

12. The method of claim 11, further comprising:
mounting the partly machined blank in a defined position for the measuring thereof.

13. The method of claim 12, wherein the mounting occurs within grippers.

14. The method of claim 1, wherein:
the final overall shape comprises a turbine blade with a shroud band; and
the turbine blade has a surface within the range of N4 to N5 at tolerances of +/−0.002 mm, a length within a range of 10 to 400mm with a rotating diameter of 50 to 400 mm, and a weight of 0.01 to 40 kg.

15. The method of claim 1, wherein:
the final overall shape comprises a turbine blade without a shroud band; and
the turbine blade has a surface within the range of N4 to N5 at tolerances of +/−0.002 mm, a length within a range of 10 to 400mm with a rotating diameter of 50 to 400 mm, and a weight of 0.01 to 40 kg.

16. The method of claim 1, wherein the final overall shape is cleaned after the second milling step.

17. The method of claim 1, wherein the final overall shape is measured after the second milling step.

18. The method of claim 1, wherein the final overall shape is packed after the second milling step.

19. The method of claim 1, wherein:
the first adapter grips the blank at a first end, so that in the first milling step a second end of the blank is given the final partial shape; and
the second adapter grips the partly machined blank at the final partial shape, so that in the second milling step the first end is processed into the final overall shape.

20. The method of claim 1, wherein the final partial shape comprises the root region of a turbine blade.

21. A method of machining a blank from all directions using at least one machine tool, the method comprising:
a first machining step in which the blank is held by at least one first adapter and a first region is given a final partial shape by the machine tool, with the final partial shape corresponding to an intended use; and
a second machining step in which the partly machined blank is held in the first region by at least one second adapter, and a remaining region is given a final overall shape by the machine tool corresponding to the intended use;
wherein the final partial shape comprises the root region of a turbine blade;
wherein in the first machining step two defined gripping surfaces in the form of blind holes are milled on each of two opposite sides of the blank, a top pair being used for gripping with a gripper for removing the partly machined blank from a machining region of the machine tool and for repositioning the partly machined blank, and a bottom pair being used for defined fixing of the partly machined blank in a measuring station.

22. The method of claim 21, wherein in the second machining step a center hole is milled on a side remote from the root region, and a traversable tailstock is moved into the center hole at least during stock removal steps during the second machining step.

23. The method of claim 21, wherein in the second machining step a center hole is milled on a side remote from the root region, and a pivotally mounted tailstock is moved into the center hole at least during stock removal steps during the second machining step.

24. The method of claim 1, wherein:
the first adapter grips the blank at a first end so that in the first milling step a center region of the blank is given the final partial shape; and
the second adapter grips the partly machined blank at the final partial shape in the center region and at least one end region of the blank is processed into the final overall shape.

25. The method of claim 24, wherein one of the end regions of the blank is also given the final partial shape in the first milling step.

26. The method of claim 1, wherein:
the first adapter grips the blank at a first end and a second end is fixed via a tailstock and center hole, so that in the first milling step a center region of the blank is given the final partial shape; and
the second adapter grips the partly machined blank at the final partial shape in the center region and at least one end region of the blank is processed into the final overall shape.

27. A method of machining a blank from all directions using at least one machine tool, the method comprising:
a first machining step in which the blank is held by at least one first adapter and a first region is given a final partial shape by the machine tool, with the final partial shape corresponding to an intended use; and
a second machining step in which the partly machined blank is held in the first region by at least one second adapter, and a remaining region is given a final overall shape by the machine tool corresponding to the intended use;
wherein the first adapter grips the blank at a first end and a second end is fixed via a tailstock and center hole, so that in the first machining step a center region of the blank is given the final partial shape;
wherein the second adapter grips the partly machined blank at the final partial shape in the center region and at least one end region of the blank is processed into the final overall shape; and
wherein one of the end regions of the blank is also given the final partial shape in the first machining step.

28. The method of claim 27, wherein the tailsock is a traversable tailstock.

29. The method of claim 27, wherein the tailsock is a pivotally mounted tailstock.

30. The method of claim 1, wherein the final partial shape comprises a turbine blade.

31. A method of machining a blank from all directions using at least one machine tool, the method comprising:
a first machining step in which the blank is held by at least one first adapter and a first region is given a final partial shape by the machine tool, with the final partial shape corresponding to an intended use;
a second machining step in which the partly machined blank is held in the first region by at least one second adapter, and a remaining region is given a final overall shape by the machine tool corresponding to the intended use;
wherein the final partial shape comprises a turbine blade; and
wherein during the first machining step, unmachined projecting portions are left in at least one location of the turbine blade selected from the group consisting of a tip part and a root part.

32. The method of claim 31, wherein recesses are provided between the projecting portions.

33. A method of machining a blank from all directions using at least one machine tool, the method comprising:
- a first machining step in which the blank is held by at least one first adapter and a first region is given a final partial shape by the machine tool, with the final partial shape corresponding to an intended use;
- a second machining step in which the partly machined blank is held in the first region by at least one second adapter, and a remaining region is given a final overall shape by the machine tool corresponding to the intended use;
- wherein the final partial shape comprises a turbine blade; and
- wherein the second adapter grips the partly machined turbine blade using two gripping jaws, with the partly machined turbine blade defined on an axis that comes to lie substantially perpendicular to a fastening axis of the second adapter in the machine tool.

34. The method of claim 1, wherein:
- at least two machine tools are used simultaneously in a cell; and
- the blank, the partly machined blank and the final overall shape are fed using a handling system via a handling portal and a central control to the machine tool.

35. The method of claim 34, wherein:
- the handling portal comprises at least one selected from the group consisting of at least one measuring unit, at least one cleaning unit, at least one workpiece buffer location, a loading belt, an adapter magazine, a discharge station, a washing and preserving unit, a material-code-reading station, and an inscription unit; and
- the central control is adapted to control use of the handling portal.

36. The method of claim 7, wherein the machine tool is a milling machine.

* * * * *

UNITED STATES PATENT AND TRADEMARK OFFICE
CERTIFICATE OF CORRECTION

PATENT NO. : 7,112,017 B2 Page 1 of 1
APPLICATION NO. : 10/902075
DATED : September 26, 2006
INVENTOR(S) : Killer et al.

It is certified that error appears in the above-identified patent and that said Letters Patent is hereby corrected as shown below:

In claim 7, Col. 16, line 35, replace "took" with --tool;--

In claim 14, Col. 17, line 14, replace "400mm" with --400 mm--;

In claim 15, Col. 17, line 21, replace "400mm" with --400 mm--.

Signed and Sealed this

Fourteenth Day of August, 2007

JON W. DUDAS
*Director of the United States Patent and Trademark Office*